United States Patent
Shah et al.

(10) Patent No.: US 12,501,490 B2
(45) Date of Patent: Dec. 16, 2025

(54) TECHNIQUES FOR INCREASING NARROWBAND PHYSICAL RANDOM ACCESS CHANNEL CAPACITY

(71) Applicant: QUALCOMM Incorporated, San Diego, CA (US)

(72) Inventors: Syed Hashim Ali Shah, San Diego, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/325,278

(22) Filed: May 30, 2023

(65) Prior Publication Data

US 2024/0407006 A1    Dec. 5, 2024

(51) Int. Cl.
*H04W 74/08* (2024.01)
*H04L 1/08* (2006.01)
*H04W 74/0833* (2024.01)

(52) U.S. Cl.
CPC .......... *H04W 74/0833* (2013.01); *H04L 1/08* (2013.01)

(58) Field of Classification Search
CPC ............. H04W 74/0833; H04W 72/02; H04W 74/0866; H04L 1/08; H04L 5/0053
See application file for complete search history.

(56) References Cited

U.S. PATENT DOCUMENTS

| | | | |
|---|---|---|---|
| 2018/0279363 A1* | 9/2018 | Su | H04W 74/0838 |
| 2019/0274168 A1* | 9/2019 | Hwang | H04W 74/004 |
| 2020/0022173 A1* | 1/2020 | Luo | H04L 1/1819 |
| 2020/0068620 A1* | 2/2020 | Kim | H04W 74/0833 |
| 2020/0187265 A1* | 6/2020 | Luo | H04L 27/2605 |
| 2020/0374925 A1* | 11/2020 | Su | H04L 27/2607 |
| 2021/0360710 A1* | 11/2021 | Höglund | H04W 4/70 |
| 2022/0353660 A1* | 11/2022 | Ye | H04L 5/1469 |

FOREIGN PATENT DOCUMENTS

WO    WO-2019061319 A1    4/2019

OTHER PUBLICATIONS

International Search Report and Written Opinion—PCT/US2024/024406—ISA/EPO—Jun. 12, 2025.

* cited by examiner

*Primary Examiner* — Steven Hieu D Nguyen
(74) *Attorney, Agent, or Firm* — Holland & Hart LLP

(57) ABSTRACT

Methods, systems, and devices for wireless communications are described. A user equipment (UE) may perform an access procedure for establishing or reestablishing a connection with a network entity. The UE may transmit, as part of the access procedure, one or more repetitions of a narrowband physical random access channel (NPRACH) preamble to the network entity. Each repetition of the one or more repetitions may include a set of symbol groups, and each symbol group of the set of symbol groups may include a set of symbols used by the UE for transmitting the NPRACH preamble. In some examples, the set of symbols may include a subset of symbols to which an OCC is applied. The set of symbols may be multiplexed with one or more other sets of symbols associated with respective preambles of one or more other UEs.

30 Claims, 24 Drawing Sheets

TECHNIQUES FOR INCREASING NARROWBAND PHYSICAL RANDOM ACCESS CHANNEL CAPACITY

FIELD OF TECHNOLOGY

The following relates to wireless communications, including techniques for increasing narrowband physical random access channel capacity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for increasing narrowband physical random access channel (NPRACH) capacity. For example, the described techniques enable multiplexing of NPRACH preambles for multiple user equipment (UEs) when transmitting NPRACH. In some aspects, as part of an access procedure for establishing (or reestablishing) a connection with a network entity, a UE may determine the NPRACH preamble to include in an NPRACH transmission based on one or more other UEs multiplexed in the NPRACH. The NPRACH transmission may include one or more repetitions of the NPRACH preamble, where each repetition may include multiple symbols groups, and each symbol group may include a set of symbols. The UE may use the set of symbols or a subset of the symbols for each symbol group to transmit the NPRACH preamble and may apply one or more orthogonal cover codes (OCCs) to the set or subset of symbols. Based on the one or more OCCs, the UE may transmit the NPRACH preamble via the set of symbols, which may enable multiplexing (e.g., in a time domain and a frequency domain) with NPRACH preambles on other sets of symbols of the NPRACH by other UEs.

A method for wireless communications at a UE is described. The method may include performing an access procedure for establishing a connection with a network entity and transmitting, as part of the access procedure, one or more repetitions of a NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

An apparatus for wireless communications at a UE is described. The apparatus may include at least one processor, at least one memory coupled with the at least one processor, and instructions stored in the at least one memory. The instructions may be executable by the at least one processor to cause the apparatus to perform an access procedure for establishing a connection with a network entity and transmit, as part of the access procedure, one or more repetitions of a NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

Another apparatus for wireless communications at a UE is described. The apparatus may include means for performing an access procedure for establishing a connection with a network entity and means for transmitting, as part of the access procedure, one or more repetitions of a NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

A non-transitory computer-readable medium storing code for wireless communications at a UE is described. The code may include instructions executable by a processor to perform an access procedure for establishing a connection with a network entity and transmit, as part of the access procedure, one or more repetitions of a NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

Some examples of the method, apparatuses, and non-transitory computer-readable medium described herein may further include operations, features, means, or instructions for generating the NPRACH preamble for each symbol group of the set of symbol groups based on a format of the NPRACH preamble and a quantity of the one or more other UEs multiplexed with the UE and prepending a cyclic prefix (CP) to each symbol group of the set of symbol groups.

Some examples of the method, apparatuses, and non-transitory computer-readable medium described herein may further include operations, features, means, or instructions for determining a quantity of symbols of the subset of symbols for transmitting the NPRACH preamble, where the quantity of symbols may be based on the quantity of the one or more other UEs multiplexed with the UE, and where the NPRACH preamble may be generated based on the quantity of symbols.

In some examples of the method, apparatuses, and non-transitory computer-readable medium described herein, the set of symbols includes the subset of symbols and zero or more empty symbols different from the subset of symbols.

In some examples of the method, apparatuses, and non-transitory computer-readable medium described herein, the set of symbols includes two or more copies of the subset of symbols and one or more empty symbols different from the subset of symbols and the OCC may be applied to each copy of the two or more copies.

In some examples of the method, apparatuses, and non-transitory computer-readable medium described herein, the set of symbols includes a second subset of symbols to which a second OCC may be applied.

Some examples of the method, apparatuses, and non-transitory computer-readable medium described herein may further include operations, features, means, or instructions for generating the NPRACH preamble for each symbol group of the set of symbol groups based on a format of the NPRACH preamble and a quantity of the one or more other UEs multiplexed with the UE, where the set of symbols includes a second subset of symbols to which a second OCC may be applied, and the second subset of symbols includes a first symbol corresponding to a CP.

Some examples of the method, apparatuses, and non-transitory computer-readable medium described herein may further include operations, features, means, or instructions for determining a quantity of symbols of the subset of symbols for transmitting the NPRACH preamble, where the quantity of symbols may be based on the quantity of the one or more other UEs multiplexed with the UE and based on the second subset of symbols including the first symbol corresponding to the CP.

In some examples of the method, apparatuses, and non-transitory computer-readable medium described herein, the set of symbols includes one or more copies of the subset of symbols to which the OCC may be applied and the second subset of symbols to which the second OCC may be applied, the second OCC including a cyclically-shifted version of the OCC.

In some examples of the method, apparatuses, and non-transitory computer-readable medium described herein, a last symbol of the subset of symbols may be the same as the first symbol of the second subset of symbols corresponding to the CP and the first symbol of the second subset of symbols may be based on the second OCC.

In some examples of the method, apparatuses, and non-transitory computer-readable medium described herein, the format of the NPRACH preamble may be format 1.

Some examples of the method, apparatuses, and non-transitory computer-readable medium described herein may further include operations, features, means, or instructions for receiving a configuration message indicating a configuration of the NPRACH preamble, where transmitting the one or more repetitions of the NPRACH preamble may be based on the configuration.

In some examples of the method, apparatuses, and non-transitory computer-readable medium described herein, the configuration message may be received via a system information block.

In some examples of the method, apparatuses, and non-transitory computer-readable medium described herein, the configuration message indicates one or more OCCs including the OCC.

A method for wireless communications at a network entity is described. The method may include performing an access procedure for establishing a connection with a UE and receiving, as part of the access procedure, one or more repetitions of a NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

An apparatus for wireless communications at a network entity is described. The apparatus may include at least one processor, at least one memory coupled with the at least one processor, and instructions stored in the at least one memory. The instructions may be executable by the at least one processor to cause the apparatus to perform an access procedure for establishing a connection with a UE and receive, as part of the access procedure, one or more repetitions of a NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

Another apparatus for wireless communications at a network entity is described. The apparatus may include means for performing an access procedure for establishing a connection with a UE and means for receiving, as part of the access procedure, one or more repetitions of a NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

A non-transitory computer-readable medium storing code for wireless communications at a network entity is described. The code may include instructions executable by a processor to perform an access procedure for establishing a connection with a UE and receive, as part of the access procedure, one or more repetitions of a NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

In some examples of the method, apparatuses, and non-transitory computer-readable medium described herein, the NPRACH preamble for each symbol group of the set of symbol groups may be based on a format of the NPRACH preamble and a quantity of the one or more other UEs multiplexed with the UE and a CP may be prepended to each symbol group of the set of symbol groups.

In some examples of the method, apparatuses, and non-transitory computer-readable medium described herein, a quantity of symbols of the subset of symbols for the NPRACH preamble may be based on the quantity of the one or more other UEs multiplexed with the UE.

In some examples of the method, apparatuses, and non-transitory computer-readable medium described herein, the set of symbols includes the subset of symbols and zero or more empty symbols different from the subset of symbols.

In some examples of the method, apparatuses, and non-transitory computer-readable medium described herein, the set of symbols includes two or more copies of the subset of symbols and one or more empty symbols different from the subset of symbols and the OCC may be applied to each copy of the two or more copies.

In some examples of the method, apparatuses, and non-transitory computer-readable medium described herein, the set of symbols includes a second subset of symbols to which a second OCC may be applied.

In some examples of the method, apparatuses, and non-transitory computer-readable medium described herein, the NPRACH preamble for each symbol group of the set of symbol groups may be based on a format of the NPRACH preamble and a quantity of the one or more other UEs multiplexed with the UE and the set of symbols includes a second subset of symbols to which a second OCC may be applied, and the second subset of symbols includes a first symbol corresponding to a CP.

In some examples of the method, apparatuses, and non-transitory computer-readable medium described herein, a quantity of symbols of the subset of symbols for receiving the NPRACH preamble may be based on the quantity of the one or more other UEs multiplexed with the UE and based on the second subset of symbols including the first symbol corresponding to the CP.

In some examples of the method, apparatuses, and non-transitory computer-readable medium described herein, the set of symbols includes one or more copies of the subset of symbols to which the OCC may be applied and the second subset of symbols to which the second OCC may be applied, the second OCC including a cyclically-shifted version of the OCC.

In some examples of the method, apparatuses, and non-transitory computer-readable medium described herein, a last symbol of the subset of symbols may be the same as the first symbol of the second subset of symbols corresponding to the CP and the first symbol of the second subset of symbols may be based on the second OCC.

In some examples of the method, apparatuses, and non-transitory computer-readable medium described herein, the one or more repetitions of the NPRACH preamble may be combined and the access procedure may be based on a combination of the one or more repetitions.

Some examples of the method, apparatuses, and non-transitory computer-readable medium described herein may further include operations, features, means, or instructions for transmitting a configuration message indicating a configuration of the NPRACH preamble, where receiving the one or more repetitions of the NPRACH preamble may be based on the configuration.

In some examples of the method, apparatuses, and non-transitory computer-readable medium described herein, the configuration message may be transmitted via a system information block.

In some examples of the method, apparatuses, and non-transitory computer-readable medium described herein, the configuration message includes one or more OCCs including the OCC.

DETAILED DESCRIPTION

Figure 1:
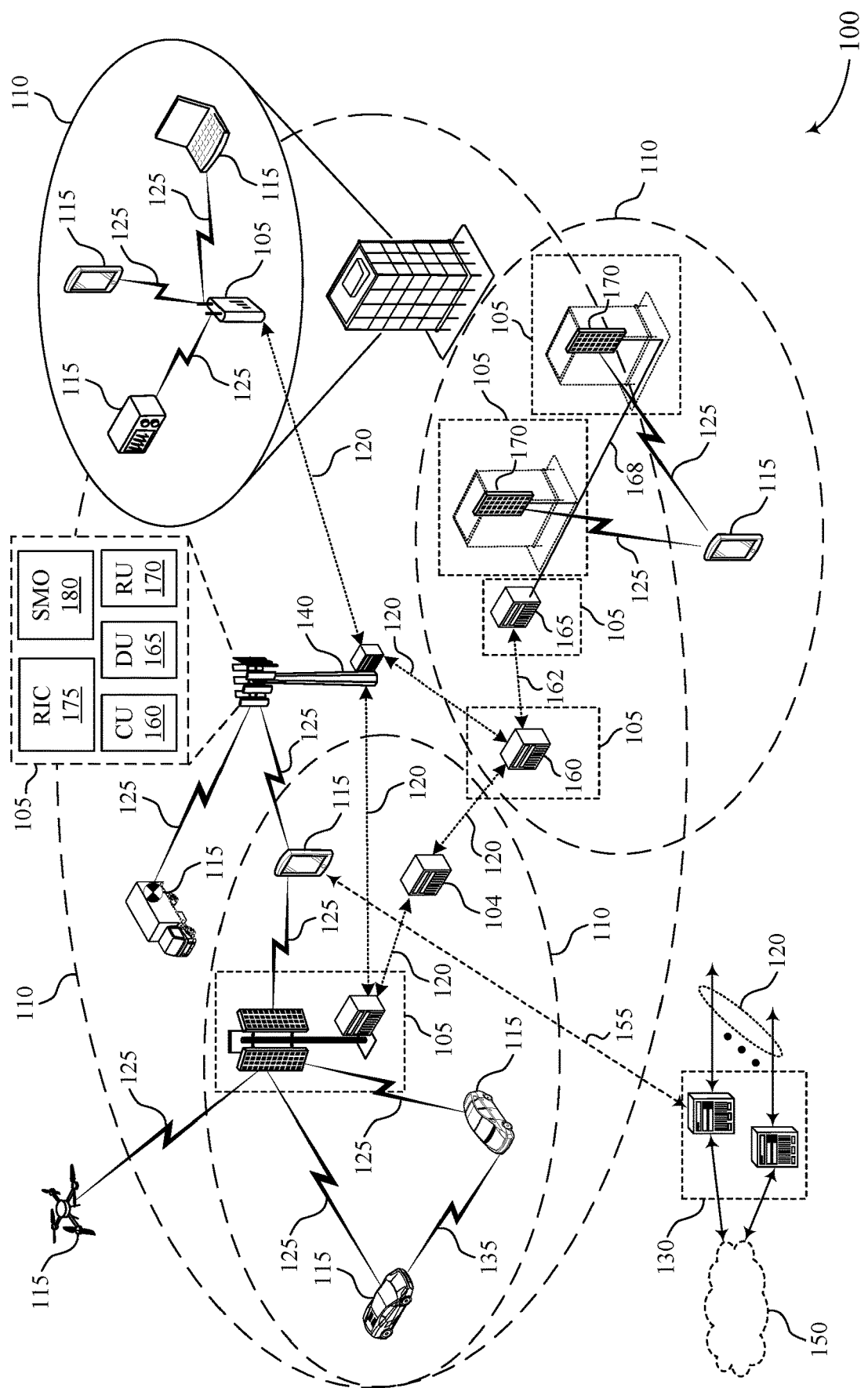
FIG. 1 shows an example of a wireless communications system that supports techniques for increasing narrowband physical random access channel (NPRACH) capacity in accordance with one or more aspects of the present disclosure.

In some wireless communications systems, a user equipment (UE) may transmit a random access message to establish a connection with a network, which may include, for example, initially connecting with the network or reestablishing a connection with the network. In such cases, the UE may transmit a preamble to a network entity via a channel (e.g., a physical random access channel (PRACH)), and the network entity may respond with a random access response that provides additional information for establishing the connection (e.g., a resource grant, a timing advance, an identifier, or the like). For some wireless communications systems (e.g., systems that support narrowband communications, such as non-terrestrial networks (NTNs), among other example networks), a UE may transmit a narrowband physical random access channel (NPRACH) preamble via an NPRACH. The UE may transmit multiple repetitions of the NPRACH preamble with each repetition including a set of symbol groups and each symbol group including a set of symbols. In some cases, however, it may be desirable to increase the capacity of the NPRACH, for example, to enable a greater quantity of UEs to transmit an NPRACH preamble to a network.

To increase the capacity of NPRACH (e.g., in non-terrestrial and other networks), a UE may transmit an NPRACH preamble via the set of symbols for each symbol group, which may be multiplexed with NPRACH preambles transmitted by one or more other UEs. Here, a system may support multiplexing of multiple NPRACH preambles for respective UEs, thereby increasing the capacity and efficiency of the NPRACH. In some cases, orthogonal cover codes (OCCs) may be used to support the multiplexing of UEs transmitting the NPRACH preambles via the NPRACH. For example, a UE may transmit the NPRACH preamble via a set of symbols or a subset of symbols of a symbol group with an OCC applied. In some cases, a network entity may indicate the OCC in a configuration for the NPRACH preamble, and the OCC may be different from other OCCs configured for other UEs that are multiplexed with the UE. In some examples, the set of symbols may include a subset of symbols to which the OCC is applied and one or more empty symbols. In other examples, the set of symbols may include the subset of symbols to which the OCC is applied and no empty symbols. The set of symbols may include one or more copies of the subset of symbols to which the OCC is applied. In some cases, the UE may append a cyclic prefix (CP) to the set of symbols, or the set of symbols may include the CP.

The described techniques for multiplexing NPRACH preambles may provide efficient utilization of time-frequency resources for the NPRACH. For example, by enabling multiplexing respective NPRACH preambles sent via the set of symbols and using OCCs, the system may support an increased number of UEs that share the NPRACH simultaneously, which may result in an increased capacity of the NPRACH. The techniques described herein may further increase efficiency and throughput of communications, while enabling robust access procedures for multiple UEs. For example, by multiplexing NPRACH preambles transmitted via the NPRACH, the UE may reduce latencies associated with the UE waiting for the NPRACH to be available, because UEs may share the NPRACH with other UEs that are transmitting respective NPRACH preambles. Further, the OCCs applied to the symbols transmitted by respective UEs may enable the network to efficiently differentiate between one or more repetitions of the preamble transmitted by each UE.

Aspects of the disclosure are initially described in the context of wireless communications systems. Aspects of the disclosure are further described in the context of resource diagrams, encoding configurations, receiver architectures, and process flows. Aspects of the disclosure are further illustrated by and described with reference to apparatus diagrams, system diagrams, and flowcharts that relate to techniques for increasing NPRACH capacity.

FIG. 1 shows an example of a wireless communications system 100 that supports techniques for increasing NPRACH capacity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some cases, one or more of the network entities 105 may be an example of an entity in an NTN. An NTN may refer to a wireless communications network that support various space-borne and/or aerial communications, which may include Geostationary Earth Orbit (GEO) satellite constellations, Medium Earth Orbit (MEO) satellite constellations, Low Earth Orbit (LEO) satellite constellations, high-altitude platform systems (HAPS), low-altitude platform systems (LAPS), air-to-ground (A2G) networks, among other examples. As such, a network entity 105 may be an example of a satellite or other component (e.g., an aircraft, an unmanned aerial vehicle (UAV) (which may be referred to as a drone or other similar terminology), or the like) of an NTN, which may support improved connectivity and broader coverage, among other benefits. In some aspects, NTNs may implement various techniques that enable enhanced synchronization between a UE 115 and a network entity 105 of the NTN.

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for increasing NPRACH capacity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

Narrowband IoT (NB-IoT) may refer to low-power wide area communications used for a number of different devices (e.g., UEs 115). Communications in accordance with NB-IoT may utilize a bandwidth within some narrowband (e.g., a 200 kHz radio frequency band). As such, NB-IoT may provide for efficient power consumption by the various devices while also enabling enhanced system capacity and spectrum efficiency. Accordingly, systems that support NB-IoT may provide for increased battery life and increased connection density for a relatively high number of UEs 115. In some implementations, NB-IoT may be used to support various deployments, such as smart metering, facility management, connections to various appliances and devices, and industrial applications, to name a few.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a CP. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of Ts=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the CP prepended to each symbol period). In some wireless communications systems 100, a slot may further be divided into multiple mini-slots associated with one or more symbols. Excluding the CP, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may operate in accordance with various states or modes for communicating with a network. As an example, a UE 115 may operate in an RRC idle state (e.g., RRC_IDLE), an RRC inactive state (e.g., RRC_INACTIVE), and/or an RRC connected state (e.g., RRC_CONNECTED). The UE 115 may transition between the various states or modes, for example, based on communications traffic for the UE 115. In the RRC idle state (which may be referred to as an idle mode), a UE 115 may not be registered to a particular cell, and may accordingly lack an access stratum (AS) context, and the UE 115 may thus not have an active RRC connection established with the network (e.g., via a network entity 105). In the idle mode, the UE 115 may wake up periodically to monitor channels for paging or other signaling, and the mobility of the UE 115 may be managed by the UE 115 when performing measurements of one or more cells. In the RRC connected state (which may be referred to as a connected mode), the UE 115 may have an established RRC connection (e.g., with a 5GC) where the network may store an AS context. Here, the UE 115 may belong to a known cell and may be identified using a cell radio network temporary identifier (C-RNTI) assigned to the UE 115. While in the connected mode, the UE 115 may monitor for messages transmitted by the network, which may include monitoring various channels (e.g., paging channels, control channels, or the like).

The RRC inactive state may be used to reduce signaling overhead and may provide an intermediate mode (e.g., between idle and connected), which may also be used to reduced latency when transitioning to another mode (e.g., to the connected mode). The UE 115 may periodically wake up while in the inactive mode to monitor for paging messages from the network, where the UE 115 may in some cases, perform a random access procedure to move to the connected mode and communicate with the network.

A UE 115 may establish time-frequency synchronization with one or more network entities 105, which may be achieved through various signaling and access procedures. For example, downlink synchronization may be achieved through the reception of synchronization signals (e.g., synchronization signal blocks) sent (e.g., broadcast) by a network entity 105 in particular time intervals. Uplink synchronization may be established through one or more random access procedures performed by a UE 115. Synchronization between a UE 115 and a network entity 105 enables the UE 115 to access the network for transmission and reception of data.

The wireless communications system 100 may support an NPRACH that enables multiplexing of multiple NPRACH preambles from different UEs 115. In some examples, a UE 115 may perform an access procedure (e.g., a random access procedure) for establishing or reestablishing a connection with a network entity 105. The UE 115 may transmit, as part of the access procedure, one or more repetitions of an NPRACH preamble to the network entity 105. Each repetition of the one or more repetitions may include a set of symbol groups, and each symbol group of the set of symbol groups may include a set of symbols used by the UE 115 for transmitting the NPRACH preamble. In some cases, the set of symbols may include a subset of symbols to which an OCC is applied. The set of symbols may be multiplexed (e.g., in a time domain and/or a frequency domain) with one or more other sets of symbols associated with respective preambles of one or more other UEs 115.

Figure 2:
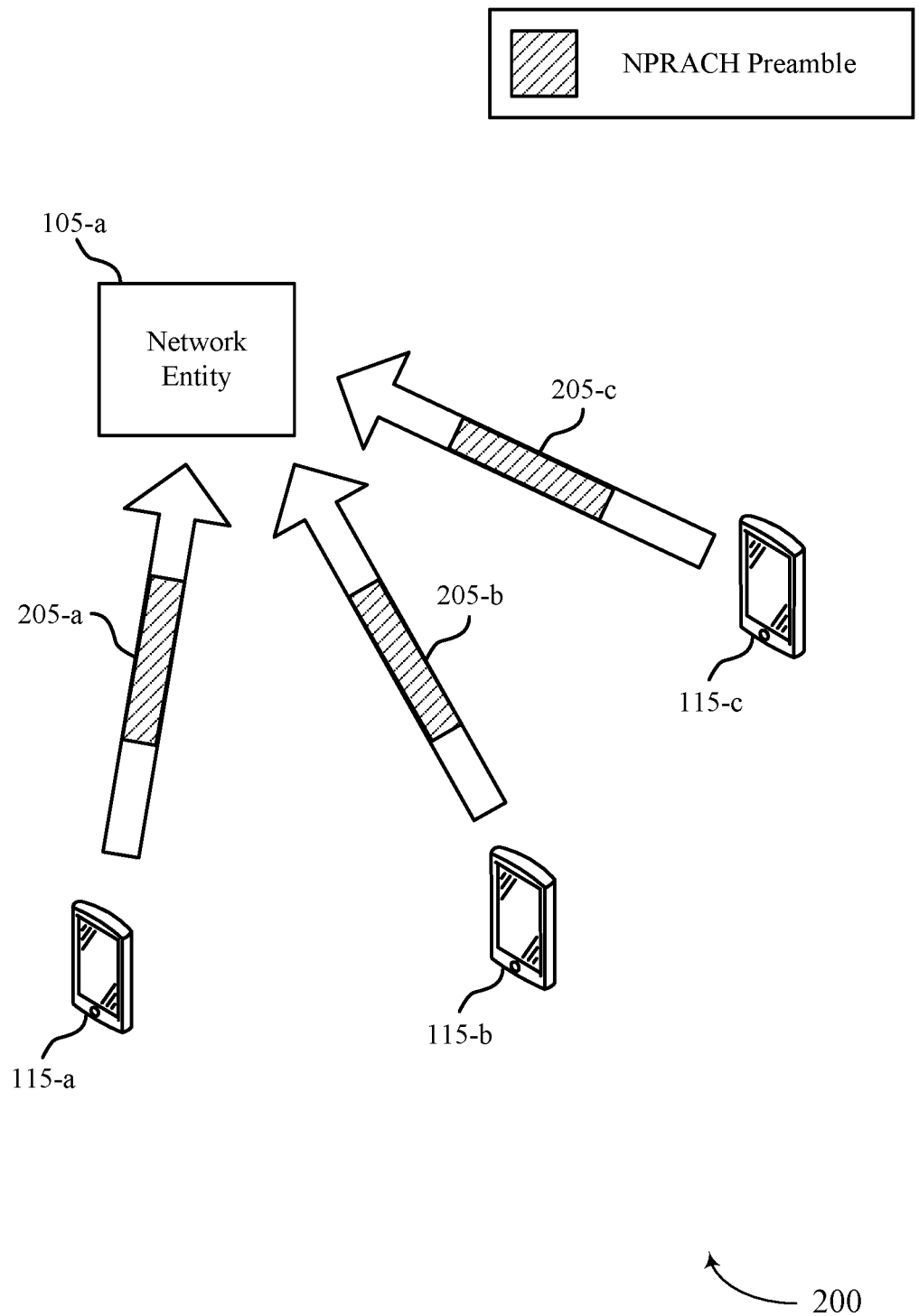
FIG. 2 shows an example of a wireless communications system that supports techniques for increasing NPRACH capacity in accordance with one or more aspects of the present disclosure.

FIG. 2 shows an example of a wireless communications system 200 that supports techniques for increasing NPRACH capacity in accordance with one or more aspects of the present disclosure. The wireless communications system 200 may implement or may be implemented by aspects of the wireless communications system 100. For example, the wireless communications system 200 may include a UE 115-a, a UE 115-b, a UE 115-c, and a network entity 105-a, which may be examples of corresponding device as described with reference to FIG. 1.

The UE 115-a may transmit an NPRACH preamble 205-a to the network entity 105-a. The UE 115-a and the network entity 105-a may use the NPRACH preamble to initialize uplink connection and for timing synchronization, or, in some cases, frequency synchronization (e.g., carrier frequency offset (CFO)). In some cases, the UE 115-b may transmit an NPRACH preamble 205-b to the network entity 105-a, and the UE 115-c may transmit an NPRACH preamble 205-c to the network entity 105-a. However, in some cases, the NPRACH may have a limited number of time-frequency resources available for preamble transmissions. In such cases, the UE 115-b and the UE 115-c may be unable to transmit an NPRACH preamble 205 due to limited NPRACH capacity. For example, the UE 115-b and the UE 115-c may be unable to transmit the NPRACH preamble 205-b and the NPRACH preamble 205-c, respectively, because there may be no available resources at the NPRACH.

In some cases, the wireless communications system 200 may support increased capacity for the NPRACH by enabling multiplexing (e.g., frequency division multiplexing) of multiple UEs 115. For example, the NPRACH may have a symbol group structure, described in greater detail with reference to FIG. 3, which may enable multiplexing of NPRACH preambles 205 within preamble repetition units (PRUs) (e.g., one or more repetitions) of the NPRACH. Such multiplexing of multiple preambles via the NPRACH may increase a capacity of the NPRACH. For example, an NPRACH preamble 205-a of the UE 115-a may be multiplexed with an NPRACH preamble 205-b of the UE 115-b and an NPRACH preamble 205-c of the UE 115-c when sent via the NPRACH. Using multiplexing, the wireless communications system 200 may support an increased quantity of UEs 115 sharing the same time-frequency resources (e.g., of the NPRACH) compared to cases when multiplexing is not used. The quantity of UEs 115 capable of sharing the same time-frequency resources in an NPRACH may be referred to as the capacity of the NPRACH.

In some examples, multiplexing the multiple UEs 115 may create interference at the network entity 105-a when the NPRACH is received, and one or more of the UEs 115 may use OCCs applied to symbols of the NPRACH preamble to mitigate interference. For example, the network entity 105-a may configure each of the UEs 115 with an OCC that may be unique to each of the UEs 115 (e.g., a UE-specific OCC). The network entity 105-a may configure the UEs 115 with OCCs, and the UEs 115 may multiplex (e.g., FDD) using an OCC-based scheme, which may reduce interference from multiplexing. By using such OCC-based techniques, the network entity 105-a and the UEs 115 may increase NPRACH capacity applicable to FDD systems. In some cases, performance with OCC may be improved by interference randomization.

The network entity 105-a may transmit control signaling to the UE 115-a that indicates a multiplexing order and an orthogonal cover coding configuration to apply to the NPRACH preamble 205-a. A multiplexing order, M, may indicate a quantity of different UEs 115 (e.g., UE 115-a, UE 115-b, UE 115-c) that may be multiplexed over the same time-frequency resources of the NPRACH. The network entity 105-a may indicate the repetition configuration and the OCC configuration to the M UEs 115 that may transmit multiplexed NPRACH preambles 205. Each UE 115 may perform M factor cover coding using the OCC, and the transmissions by the M UEs may accordingly be orthogonal. For example, each UE 115 (e.g., UE 115-a, UE 115-b, UE 115-c) may perform the M-factor cover coding using indicated rows or columns of a Hadamard matrix or a DFT matrix, where the size of the Hadamard matrix or DFT matrix is based on the size of M. The Hadamard matrix or DFT matrix may have a size M×M (e.g., M rows and M columns). The M-factor cover coding may be performed on a symbol by symbol basis.

Figure 3:
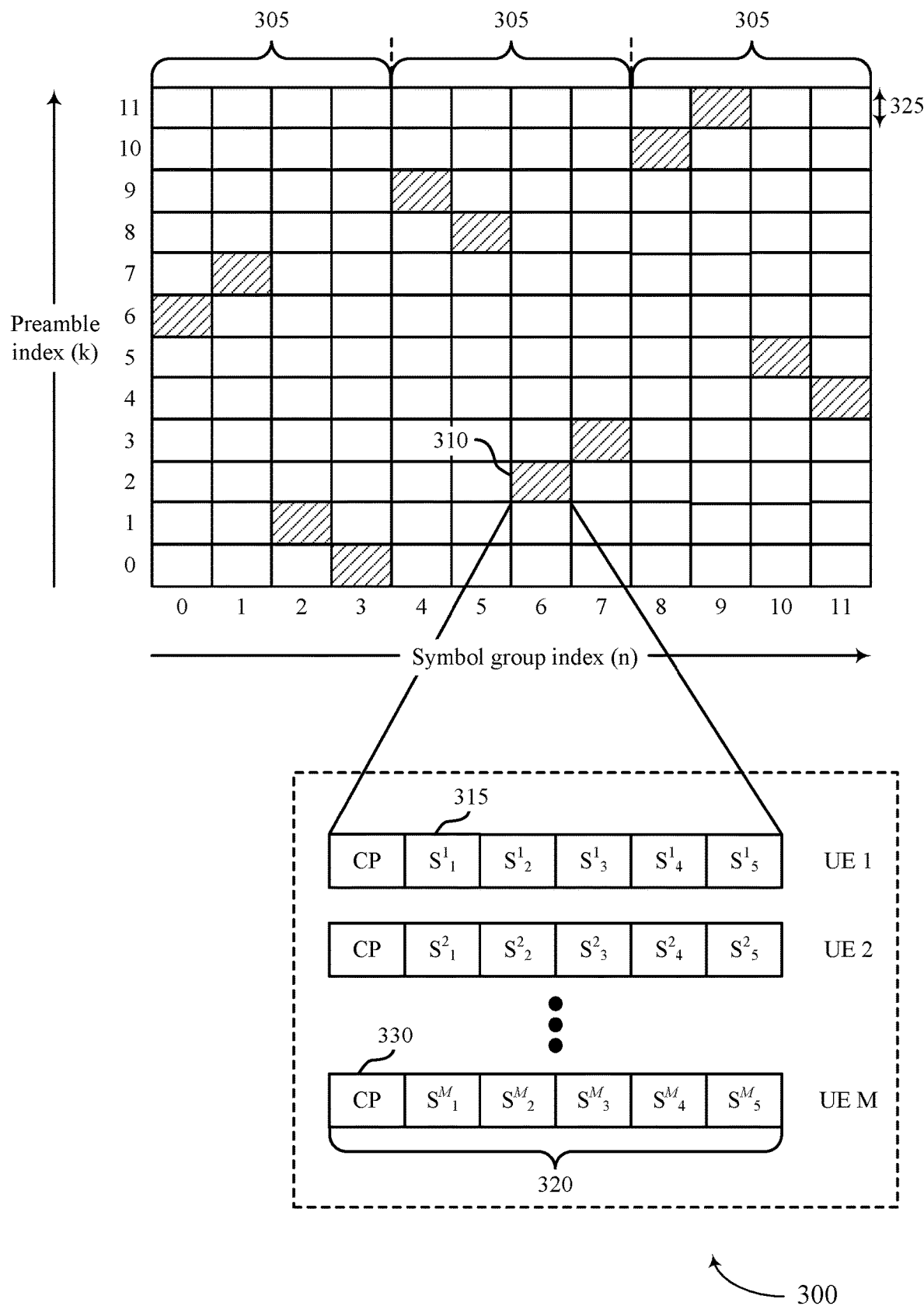
FIG. 3 shows an example of a resource diagram that supports techniques for increasing NPRACH capacity in accordance with one or more aspects of the present disclosure.

FIG. 3 shows an example of a resource diagram 300 that supports techniques for increasing NPRACH capacity in accordance with one or more aspects of the present disclosure. The resource diagram 300 may implement or may be implemented by aspects of the wireless communications system 100 or the wireless communications system 200. For example, one or more symbol groups 310 and one or more sets of symbols 320 may be included in respective NPRACH preambles transmitted from two or more UEs 115 to a network entity 105, as described with reference to FIG. 2.

In some examples, resources may be configured for a UE 115 for transmitting an NPRACH preamble, which may include one or more PRUs 305, and a respective PRU 305 may include multiple symbol groups 310. The resources in symbol groups 310 may be configured with a hopping pattern (e.g., across frequency resources) such that each PRU 305 may include a different allocation of resources for the symbol groups 310. Each symbol group 310 may include N OFDM symbols, and each PRU 305 may include G symbol groups 310. In some examples, the UE 115 may transmit the NPRACH preamble with up to 128 PRACH repetitions (e.g., 128 PRUs). In some cases, each PRU 305 may have some duration (e.g., 6.4 ms), and each symbol group 310 may be indexed by a preamble index k and a symbol group index n. The preamble index may be partitioned in frequency by a subcarrier spacing 325 (e.g., $\Delta f_{RA}$). In some cases, the subcarrier spacing 325 may be 3.75 kHz.

Multiple (e.g., M) UEs may share NPRACH resources of the symbol group 310 simultaneously (e.g., by multiplexing). For example, each of the M UEs may transmit the set of symbols 320 using the symbol group 310. The set of symbols 320 may have a duration (e.g., 1.6 ms) and may include some quantity of symbols 315 (e.g., 5 symbols 315) and a CP 330. Each symbol 315 may be denoted by $s_i^u$, where i identifies the symbol and u identifies the UE transmitting the symbol. For example, $s_3^2$ may refer to the third symbol (e.g., third symbol in a sequence of symbols in the time domain) transmitted by a second UE 115 (e.g., UE 2). The symbol 315 may have a duration of 266 µs.

The NPRACH preamble may have multiple formats. In some cases, the NPRACH preamble may be Format 0, and the CP 330 may have a duration of 66 µs. In other cases, the NPRACH preamble may be Format 1, and the CP 330 may have a duration of 266 µs. For NPRACH preamble Format 1, the duration of the symbol 315 and the duration of the CP 330 may be the same (e.g., whole-symbol CP).

In some examples, the UE 115 may use a multiplexing scheme which may not use CP information for NPRACH preamble transmissions, and respective UEs 115 may apply OCCs to at least some symbols 315 (e.g., a subset of symbols) of a set of symbols 320 associated with the symbol groups 310. In such cases, the UE 115 may multiplex with other UEs (e.g., up to five UEs may be multiplexed, M=5), and the set of symbols to be multiplexed may exclude the CP 330. In such examples, the UE 115 may prepend the CP 330 to the multiplexed symbols. The multiplexing scheme which may not use CP information may be applicable for NPRACH preamble Format 0 and NPRACH preamble Format 1. In other examples, the UE 115 may use a multiplexing scheme which uses CP information for NPRACH preamble transmissions, and respective UEs 115 may apply the OCCs to at least some symbols 315 (e.g., a subset of symbols) of a set of symbols 320 associated with the symbol groups 310. In such cases, the UE 115 may multiplex with other UEs (e.g., two or three UEs are multiplexed, M=2, 3), and the set of symbols to be multiplexed may be the set of symbols 320 including the CP 330. The multiplexing scheme which may use CP information may be applicable for NPRACH preamble Format 1.

Figure 4:
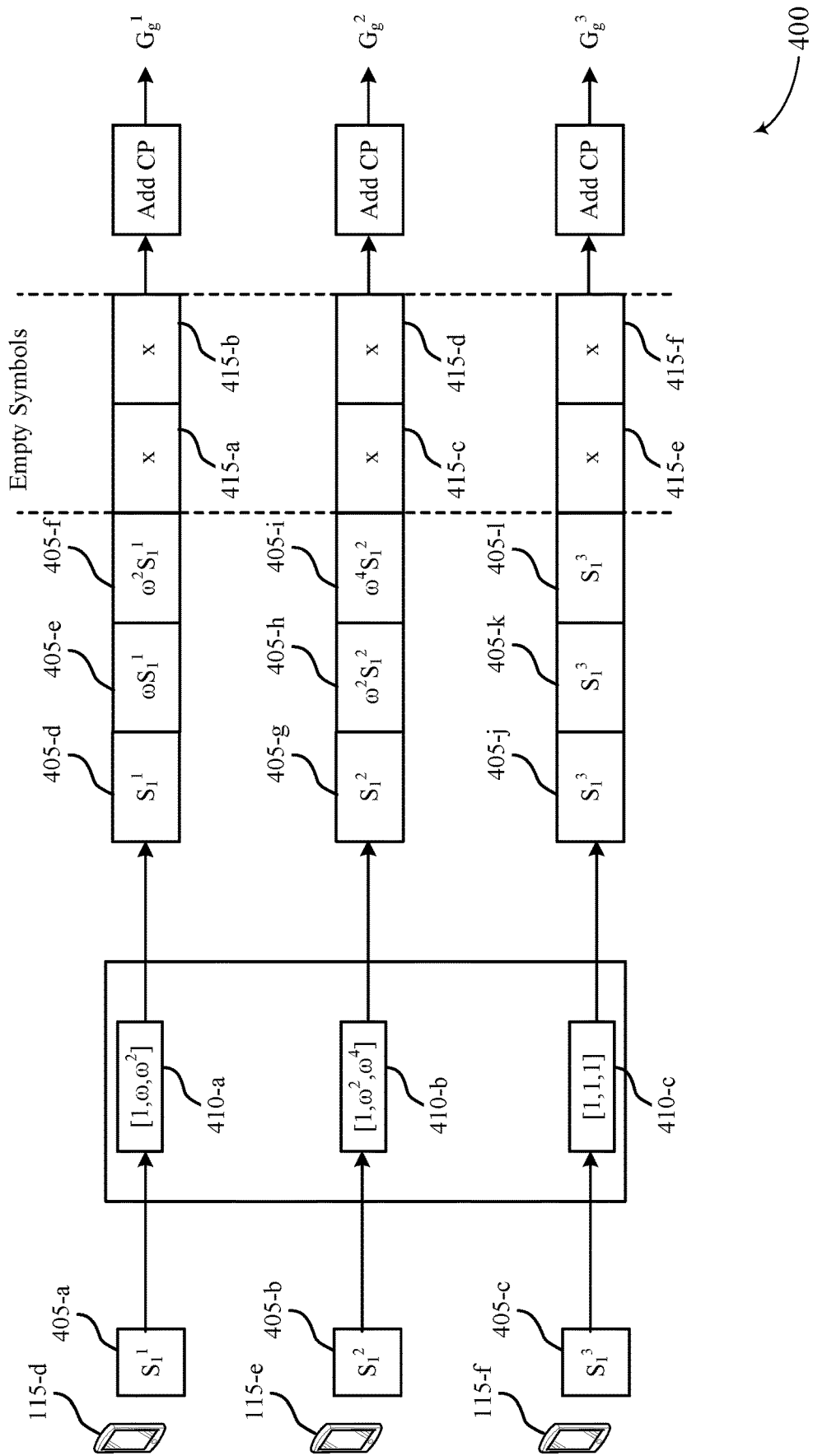
FIGS. 4 through 9 show examples of encoding configurations that support techniques for increasing NPRACH capacity in accordance with one or more aspects of the present disclosure.

FIG. 4 shows an example of an encoding configuration 400 that supports techniques for increasing NPRACH capacity in accordance with one or more aspects of the present disclosure. The encoding configuration 400 may implement or may be implemented by aspects of the wireless communications system 100 or the wireless communications system 200. For example, the encoding configuration 400 may include a UE 115-d, a UE 115-c, and a UE 115-f, which may each be an example of a UE 115, as described with reference to FIGS. 1 and 2.

The UE 115-d may apply a first OCC codeword (e.g., OCC 410-a) to a symbol 405-a (e.g., an NPRACH symbol), resulting in a subset of symbols (e.g., symbols 405-d, 405-e and 405-f) to which the first OCC codeword is applied. The UE 115-e may apply a second OCC codeword (e.g., OCC 410-b) to a symbol 405-b, resulting in a subset of symbols (e.g., symbols 405-g, 405-h, and 405-i) to which the second OCC codeword is applied. Similarly, the UE 115-f may apply a third OCC codeword (e.g., OCC 410-c) to a symbol 405-c, resulting in a subset of symbols (e.g., symbols 405-j, 405-k, and 405-l) to which the third OCC codeword is applied. In some examples, a network entity 105 may indicate the OCCs 410 to the UEs 115 (e.g., via a Hadamard or DFT matrix), and the UEs 115 may each transmit respective NPRACH preambles in accordance with (e.g., based on the application of) the OCCs 410. The OCCs 410 may be referred to as Hadamard OCCs or DFT OCCs. In some cases, the OCCs 410 may be based on (e.g., components of) a Hadamard or DFT matrix, and the Hadamard or DFT matrix may be a 3×3 matrix (e.g., three rows and three columns) based on three UEs 115 or three preambles being multiplexed.

The first OCC 410-a may correspond to a vector $[1,\omega,\omega^2]$. The UE 115-d may apply the first OCC codeword (e.g., OCC 410-a) to a symbol 405-a which may produce a subset of symbols including a symbol 405-d, a symbol 405-e, and a symbol 405-f. The symbol 405-d may be the same value as the symbol 405-a, the symbol 405-c may be the symbol 405-a multiplied by @ (e.g., $e^{(-j2\pi/3)}$), and the symbol 405-f may be the symbol 405-a multiplied by @2 (e.g., $e^{(-4\pi/3)}$), where the OCC 410-a applies multiplication factors 1, w and $\omega^2$ to the symbol 405-a to produce the subset of symbols. The second OCC 410-b may correspond to a vector $[1,\omega^2, \omega^4]$. The UE 115-e may apply the second OCC codeword (e.g., OCC 410-b) to a symbol 405-b which may produce a subset of symbols including a symbol 405-g, a symbol 405-h, and a symbol 405-i. The symbol 405-g may be the same value as the symbol 405-b, the symbol 405-h may be the symbol 405-b multiplied by @2, and the symbol 405-i may be the symbol 405-b multiplied by $\omega^4$, where the OCC 410-a applies multiplication factors 1, $\omega^2$ and $\omega^4$ to the symbol 405-a to produce the subset of symbols. The third OCC 410-c may correspond to a vector [1,1,1]. The UE 115-f may apply the third OCC codeword (e.g., OCC 410-c) to a symbol 405-c which may produce a subset of symbols including a symbol 405-j, a symbol 405-k, and a symbol 405-l. The symbol 405-j, the symbol 405-k, and the symbol 405-l may each be the same value as the symbol 405-c since the vector is [1,1,1].

Applying OCCs 410 in this manner to respective symbols 405, or respective subsets of symbols 405, may produce orthogonal outputs, and accordingly, transmissions of symbol groups for each repetition (e.g., PRU) of an NPRACH preamble from the UE 115-d, the UE 115-c, and the UE 115-m may be orthogonal and may not interfere with each other. The encoding using the OCCs 410 may be applied to a set of symbols (e.g., NPRACH symbols) for each UE 115 (e.g., symbol $s_i^u$, in which the NPRACH symbol is i at UE u within a symbol group). In some examples, each symbol group may have 5 NPRACH symbols and 1 CP. The UEs 115 may prepend a CP to the respective 5 NPRACH symbols. In some examples, the symbol 405 to which the OCC 410 is applied may be a symbol such as $s_i^u$, in which the NPRACH symbol is i at UE u, where i=1. The OCC 410 may be any length, and a length of the OCC 410 may be based on the quantity of preambles or the quantity of UEs being multiplexed. That is, a matrix used for the OCCs 410 may be an M×M matrix (e.g., M rows and M columns), where M is the number of UEs multiplexed (e.g., a quantity of UEs sharing time and frequency resources of the NPRACH).

In some examples, NPRACH preambles of one or more UEs 115 may be multiplexed in accordance with the encoding configuration 400. For example, the NPRACH preamble may include one or more repetitions (e.g., PRUs) and each repetition may include a set of symbol groups. A symbol group may be denoted by $G_g^u$ in which the NPRACH symbol group is g at UE u, where g goes from 1 to 4 within a PRU to correspond to the 4 symbol groups included in a PRU, or repetition, of the NPRACH preamble. The symbol group may include a set of symbols used by the UE 115-d for transmitting the NPRACH preamble, and the NPRACH preamble of the UE 115-d may be transmitted using the set of symbols, which may be multiplexed with one or more other sets of symbols associated with respective preambles of one or more other UEs (e.g., the UE 115-c, the UE 115-f). In some cases, the set of symbols may include a subset of symbols to which an OCC 410 is applied. For example, the symbol group Ga may include the set of symbols including the subset of symbols to which the OCC 410-a is applied. The subset of symbols may include the symbol 405-d, the symbol 405-e, and the symbol 405-f.

The symbol group $G_g^u$ may include some quantity (e.g., five) of available NPRACH symbols and a CP. Out of the available symbols within the symbol group, the UEs 115 may use any M symbols (e.g., three symbols in the case of three UEs) for the OCC 410 (e.g., the OCC 410-a) and may leave the rest of the symbols (e.g., 5-M) empty. In the example of 3 UEs, the UEs 115 may leave two symbols empty. For example, the UE 115-d may use the symbol 405-d, the symbol 405-e, and the symbol 405-f when the OCC 410-a is applied (e.g., when the OCC is applied to symbol 405-a), and may leave a symbol 415-a and a symbol 415-b empty. Similarly, a symbol 415-c and a symbol 415-d may be left empty by the UE 115-e and a symbol 415-e and a symbol 415-f may be left empty by the UE 115-f. A UE 115 may append a CP to the set of symbols to form the symbol group Ga. In some examples, each UE 115 may leave the same or different symbols empty when transmitting the respective preambles. In some cases, the empty symbols may be predefined or may be configured (e.g., by a network entity).

Each UE 115 may transmit one symbol per symbol group. The one symbol may be OCC'ed into M symbols, and the UE 115 may transmit the M OCC'ed symbols in a single symbol group. For example, the UE 115 may transmit the three OCC'ed symbols 405-d, 405-e, and 405-f in the symbol group $G_g^1$. Each UE 115-d may transmit 4 symbols (e.g., 12° C. C'ed symbols for 3 UEs multiplexed together) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

Multiplexing the NPRACH preambles of three UEs 115-d, 115-e, and 115-f as shown may be an example of the described techniques. However, the quantity of UEs supported by the described techniques may differ from three. For example, the described techniques may support multiplexing of preambles from any quantity of 2, 3, 4, or 5 UEs (e.g., 1<M<6). The M OCC'ed symbols (e.g., the symbol 405-d, the symbol 405-e, the symbol 405-f) may be placed in any manner or in any order in the symbol group G and may differ from the exemplary order or manner shown. The locations of the empty symbols 415 may also differ from the exemplary locations shown.

Figure 5:
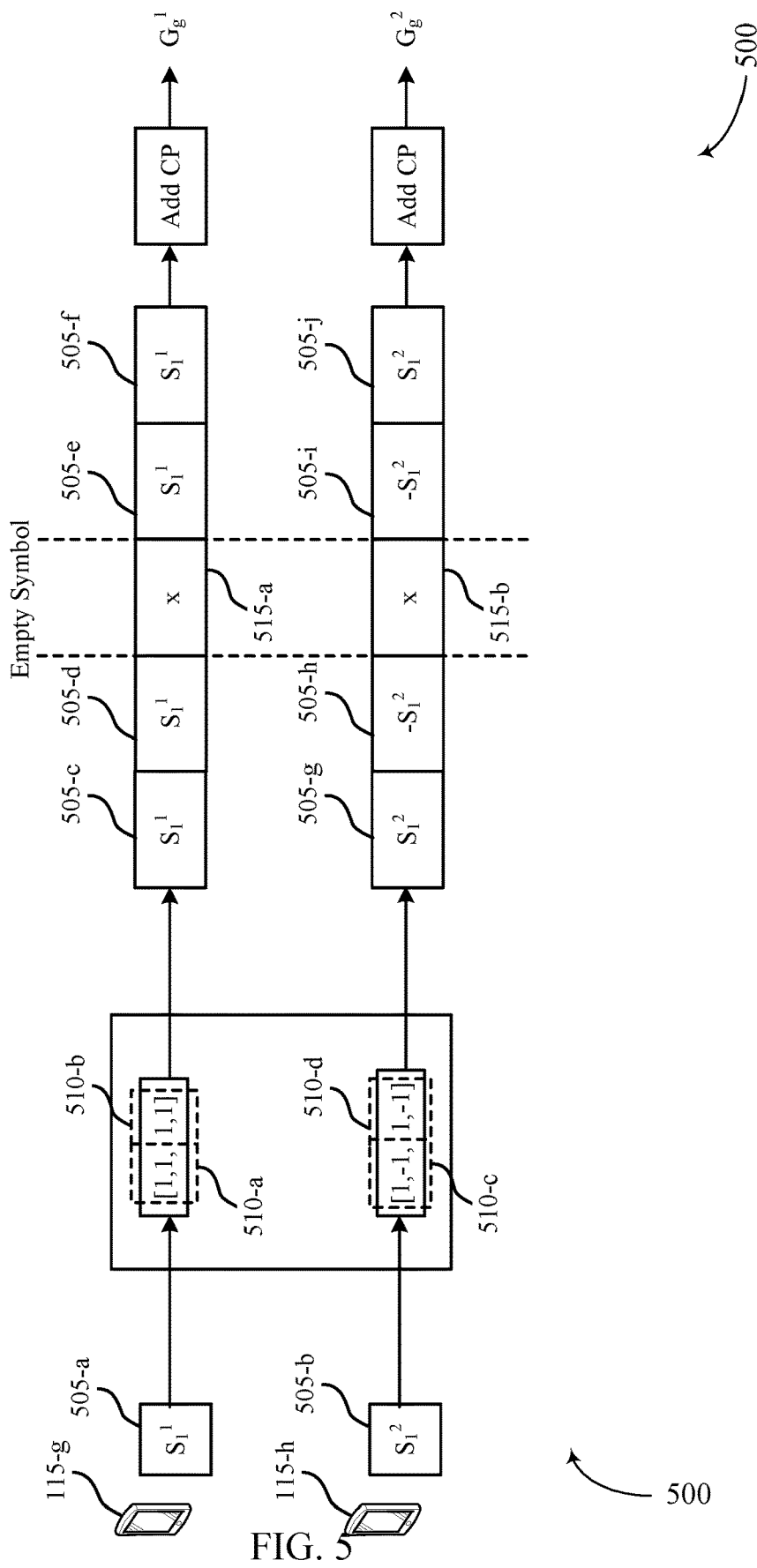

FIG. 5 shows an example of an encoding configuration 500 that supports techniques for increasing NPRACH capacity in accordance with one or more aspects of the present disclosure. The encoding configuration 500 may implement or may be implemented by aspects of the wireless communications system 100 or the wireless communications system 200. For example, the encoding configuration 500 may include a UE 115-g and UE 115-h, which may each be an example of a UE 115, as described with reference to FIGS. 1 and 2.

In some examples, the NPRACH preambles of one or more UEs 115 may be multiplexed in accordance with the encoding configuration 500. For example, the NPRACH preamble may include one or more repetitions (e.g., PRUs) and each repetition may include a set of symbol groups. A symbol group may be denoted by $G_g^u$, as described in greater detail with reference to FIG. 3. The symbol group may include a set of symbols used by the UE 115-g for transmitting the NPRACH preamble, and the preamble of UE 115-g may be transmitted via the set of symbols, which may be multiplexed with another set of symbols associated with a respective preamble of the UE 115-h.

In some cases, the set of symbols may include two or more copies of a subset of symbols to which an OCC 510 is applied. For example, the symbol group $G_g^1$ may include a set of symbols including a first copy of the subset of symbols to which the OCC 510-a is applied and a second copy of the subset of symbols to which a copy of the OCC 510-a (e.g., OCC 510-b) is applied. The OCC 510-b may be the same as the OCC 510-a because the OCC 510-b may be a copy of the OCC 510-a. In some examples, the set of symbols may include the symbol 505-c and the symbol 505-d (e.g., the first copy of the subset of symbols), to which the OCC 510-a is applied, and may include the symbol 505-e and the symbol 505-f (e.g., the second copy of the subset of symbols), to which the OCC 510-b is applied. The UE 115 115-d may apply the first copy of the OCC, the OCC 510-a, using a Hadamard or DFT OCC of length 2, and may apply the second copy of the OCC, the OCC 510-b, using a Hadamard or DFT OCC of length 2 the same as the OCC 510-a. A Hadamard OCC of length 2 and a DFT OCC of length 2 may be the same.

The symbol group $G_g^u$ may include some quantity (e.g., five) of available NPRACH symbols and a CP. A UE 115 may allocate two or more OCC copies within the symbol group $G_g^u$ and may leave the rest of the symbols empty. In the example of two UEs, a UE 115 may use two symbols for the first copy of the subset of symbols and two symbols for the second copy of the subset of symbols and may leave one symbol blank. In an example, the UE 115-g may use the symbol 505-c and the symbol 505-d when the OCC 510-a is applied (e.g., when the OCC 510-a is applied to the symbol 505-a). The UE 115-g may use the symbol 505-e and the symbol 505-f for the OCC 510-b, which may be a copy of the OCC 510-a, and may leave the symbol 515-a empty. The UE 115-h may use the symbol 505-g and the symbol 505-h when the OCC 510-c is applied (e.g., when the OCC is applied to the symbol 505-b). The UE 115-h may use the symbol 505-i and the symbol 505-j when the OCC 510-d is applied, which may be a copy of the OCC 510-c, and may leave the symbol 515-b empty. A UE 115 may append a CP to the set of symbols to form the symbol group $G_g^u$.

Each UE 115 may transmit two symbols per symbol group. Each of the two symbols may be OCC'ed into M symbols, and the UE 115 may transmit a total of 2M OCC'ed symbols in a single symbol group. For example, the UE 115-g may transmit the four OCC'ed symbols 505-c. 505-d. 505-e, and 505-f in the symbol group $G_g^1$. Each UE 115 may transmit 8 symbols (e.g., 16° C. C'ed symbols for 2 UEs multiplexed together) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

In some examples, the described techniques may support multiplexing two UEs, the UE 115-g and the UE 115-h, for transmitting the NPRACH preamble. By including multiple copies of the OCC 510 in the set of symbols of the symbol group $G_g^u$, a UE 115 may transmit fewer empty symbols compared to cases when the UE 115 includes a single copy of the OCC 510 in the symbol group. The 2M OCC'ed symbols (e.g., the symbol 505-c, the symbol 505-d, the symbol 505-e, the symbol 505-f) may be placed in any manner or in any order in the symbol group Ga and may differ from the exemplary order or manner shown. The locations of the empty symbols 515 may also differ from the exemplary locations shown.

Figure 6:
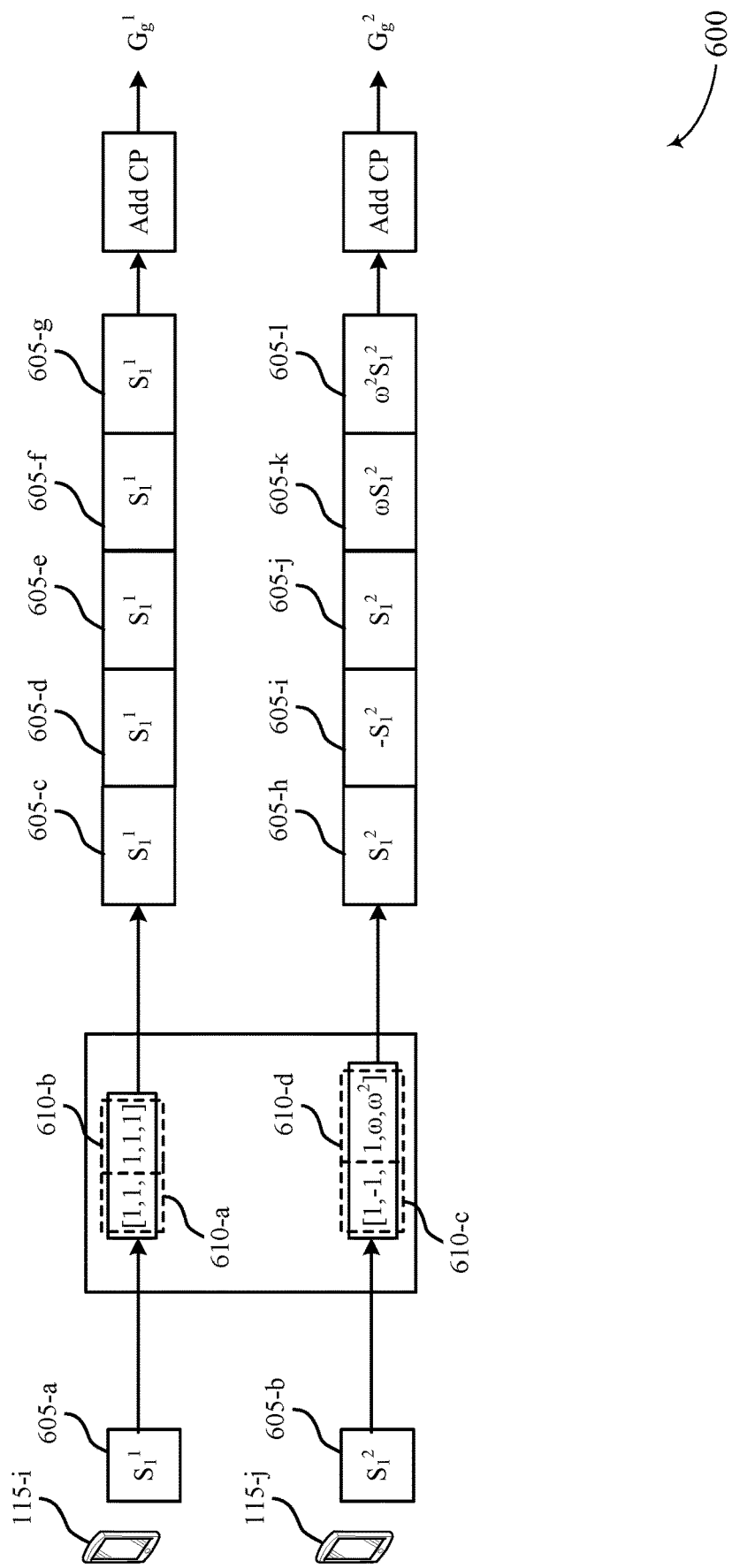

FIG. 6 shows an example of an encoding configuration 600 that supports techniques for increasing NPRACH capacity in accordance with one or more aspects of the present disclosure. The encoding configuration 500 may implement or may be implemented by aspects of the wireless communications system 100 or the wireless communications system 200. For example, the encoding configuration 600 may include a UE 115-i and UE 115-j, which may each be an example of a UE 115, as described with reference to FIGS. 1 and 2.

In some examples, the NPRACH preambles of one or more UEs 115 may be multiplexed in accordance with the encoding configuration 600. For example, the NPRACH preamble may include one or more repetitions (e.g., PRUs) and each repetition may include a set of symbol groups. A symbol group may be denoted by $G_g^u$, as described in greater detail with reference to FIG. 3. The symbol group may include a set of symbols used by the UE 115-i for transmitting the NPRACH preamble, and the NPRACH preamble of UE 115-i may be transmitted via the set of symbols, which may be multiplexed with another set of symbols associated with a respective preamble of the UE 115-j.

In some cases, the symbol group $G_g^1$ may include the set of symbols including a first subset of symbols to which an OCC 610-a is applied and a second subset of symbols to which an OCC 610-b is applied. The OCC 610-b may be different from the OCC 610-a, or the OCC 610-b may differ in length from the OCC 610-a. For example, the UE 115 115-d may apply the first OCC 510-a using a Hadamard or DFT OCC of length 2 and may apply the second OCC 610-b using a DFT OCC of length 3. In some examples, the first subset of symbols may include the symbol 605-c and the symbol 605-d. The second subset of symbols may include the symbol 605-e, the symbol 605-f and the symbol 605-g. In some examples, a quantity of the second subset of symbols may be greater than a quantity of the first subset of symbols, or the quantity of the second subset of symbols may be less than the quantity of the first subset of symbols.

The symbol group $G_g^1$ may include some quantity (e.g., five) of available NPRACH symbols and a CP. A UE 115 may allocate a first OCC (e.g., of length 2) and a second OCC (e.g., of length 3) within the symbol group $G_g^u$ such that no symbols are left empty. For example, the OCC may correspond to a vector (e.g., a DFT or Hadamard OCC codeword). In the example of 2 UEs, a UE 115 may use two symbols for the first subset of symbols and three symbols for the second subset of symbols, leaving no empty symbols. In an example, the UE 115-i may use the symbol 605-c and the symbol 605-d when the OCC 610-a is applied (e.g., when the OCC 610-a is applied to symbol 605-a). The UE 115-i may use the symbol 605-e, the symbol 605-f, and the symbol 605-g when the OCC 610-b is applied (e.g., when the OCC 610-b is applied to symbol 605-b), which may be different from the OCC 610-a, and may leave no symbols empty. The UE 115-j may use the symbol 605-h and the symbol 605-i when the OCC 610-c is applied (e.g., when the OCC 610-c is applied to the symbol 605-b). The UE 115-j may use the symbol 605-j, the symbol 605-k, and the symbol 605-l for the OCC 610-d, which may be different from the OCC 610-c, and may leave no symbols empty. A UE 115 may append a CP to the set of symbols to form the symbol group $G_g^u$.

Each UE 115 may transmit two symbols per symbol group. A first symbol of the two symbols may be OCC'ed into M symbols, and a second symbol of the two symbols may be OCC'ed into M+1 symbols. Thus, the UE 115 may transmit a total of 2M+1 OCC'ed symbols in a single symbol group. For example, the UE 115-i may transmit the five OCC'ed symbols 605-c. 605-d. 605-e, 605-f, and 605-g in the symbol group $G_g^1$. Each UE 115 may transmit 8 symbols (e.g., 20° C. C'ed symbols for 2 UEs multiplexed together) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

In some examples, the described techniques may support multiplexing two UEs 115-i and 115-j. By including a first OCC and a second OCC different from the first OCC in the set of symbols of the symbol group Ga, a UE 115 may transmit fewer empty symbols compared to cases when the UE 115 includes a single OCC in the symbol group. The 2M+1 OCC'ed symbols (e.g., the symbol 605-c, the symbol 605-d, the symbol 605-e, the symbol 605-f, the symbol 605-g) may be placed in any manner or in any order in the symbol group $G_g^u$ and may differ from the exemplary order or manner shown.

Figure 7:
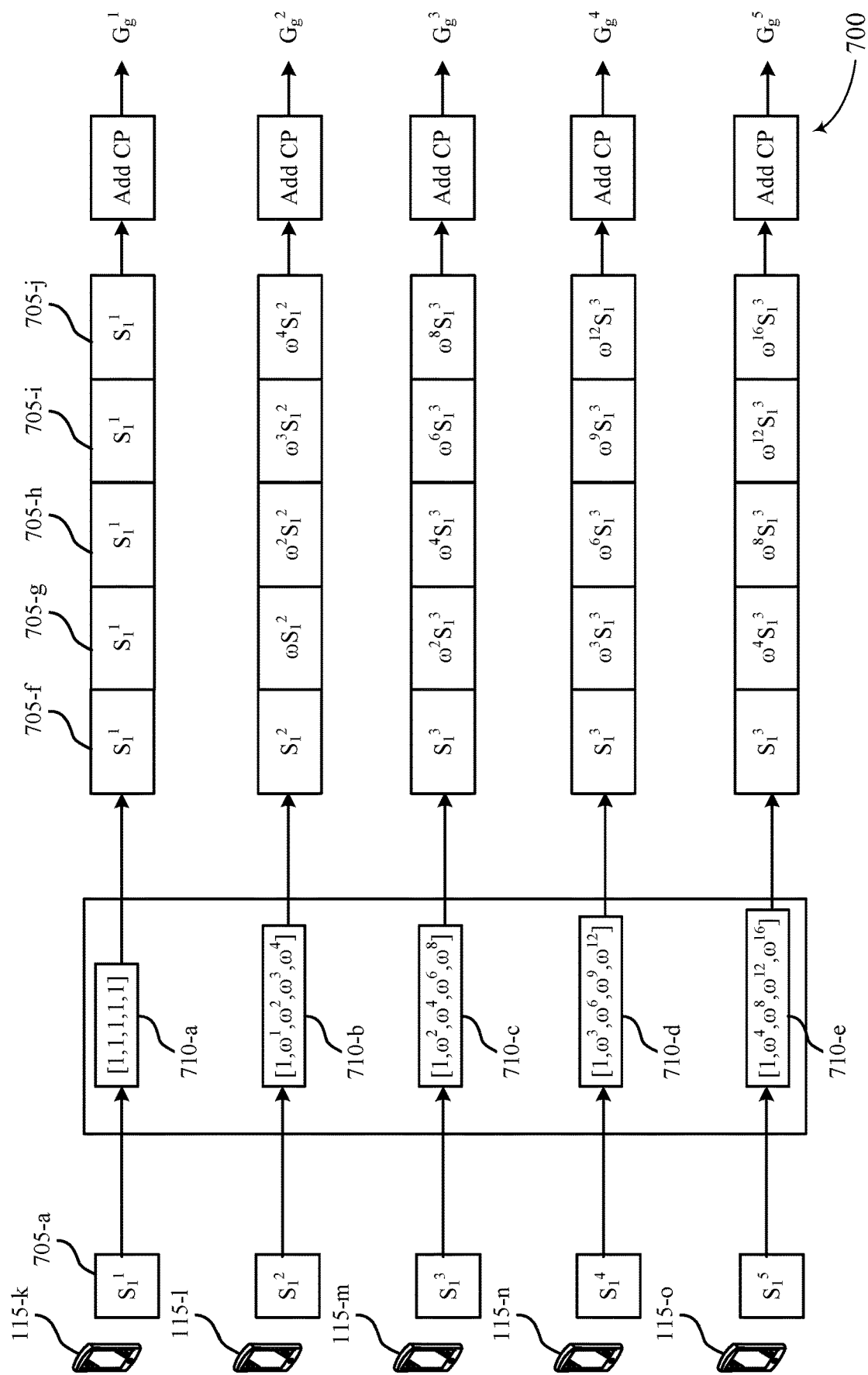

FIG. 7 shows an example of an encoding configuration 700 that supports techniques for increasing NPRACH capacity in accordance with one or more aspects of the present disclosure. The encoding configuration 700 may implement or may be implemented by aspects of the wireless communications system 100 or the wireless communications system 200. For example, the encoding configuration 700 may include a UE 115-k, a UE 115-l, a UE 115-m, a UE 115-n, and a UE 115-o, which may each be an example of a UE 115, as described with reference to FIGS. 1 and 2.

In some examples, the NPRACH preambles of one or more UEs 115 may be multiplexed in accordance with the encoding configuration 700. For example, the NPRACH preamble may include one or more repetitions (e.g., PRUs) and each repetition may include a set of symbol groups. A symbol group may be denoted by $G_g^u$, as described in greater detail with reference to FIG. 3. The symbol group may include a set of symbols used by a UE 115 (e.g., the UE 115-k) for transmitting the NPRACH preamble, and the NPRACH preamble of the UE 115-k may be transmitted via the set of symbols, which may be multiplexed with one or more other sets of symbols associated with respective preambles of one or more other UEs 115 (e.g., the UE 115-l, the UE 115-m, the UE 115-n, the UE 115-o). In some cases, the set of symbols may include a subset of symbols to which an OCC 710 is applied. For example, the symbol group $G_g^1$ may include the set of symbols including the subset of symbols to which the OCC 710-a is applied. The subset of symbols may include the symbol 705-f, the symbol 705-g, the symbol 705-h, the symbol 705-i, and the symbol 705-j.

The symbol group Ga may include some quantity (e.g., five) of available NPRACH symbols and a CP. In some cases, five UEs 115 may be multiplexed together, and a UE 115 (e.g., the UE 115-k) may use all five available NPRACH symbols when the OCC 710 is applied (e.g., when the OCC 710-a is applied to symbol 705-a), leaving no empty symbols. For example, the UE 115-d may use the symbol 705-f, the symbol 705-g, the symbol 705-h, the symbol 705-i, and the symbol 705-j when the OCC 710-a is applied (e.g., when the OCC 710-a is applied to the symbol 705-a). A UE 115 may append a CP to the set of symbols to form the symbol group $G_g^u$. Each UE 115 may be assigned a unique OCC 710 for transmitting a respective NPRACH preamble. For example, the UE 115-l may use the OCC 710-b, the UE 115-m may use the OCC 710-c, the UE 115-n may use the OCC 710-d, and the UE 115-o may use the OCC 710-e.

Each UE 115 may transmit one symbol per symbol group. The one symbol may be OCC'ed into five symbols, and the UE 115 may transmit the five OCC'ed symbols in a single symbol group. For example, the UE 115 may transmit the five OCC'ed symbols 705-f, 705-g, 705-h, 705-i, and 705-j in the symbol group $G_g^1$. Each UE 115-d may transmit 4 symbols (e.g., 20° C. C'ed symbols for 5 UEs multiplexed together) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

Figure 8:
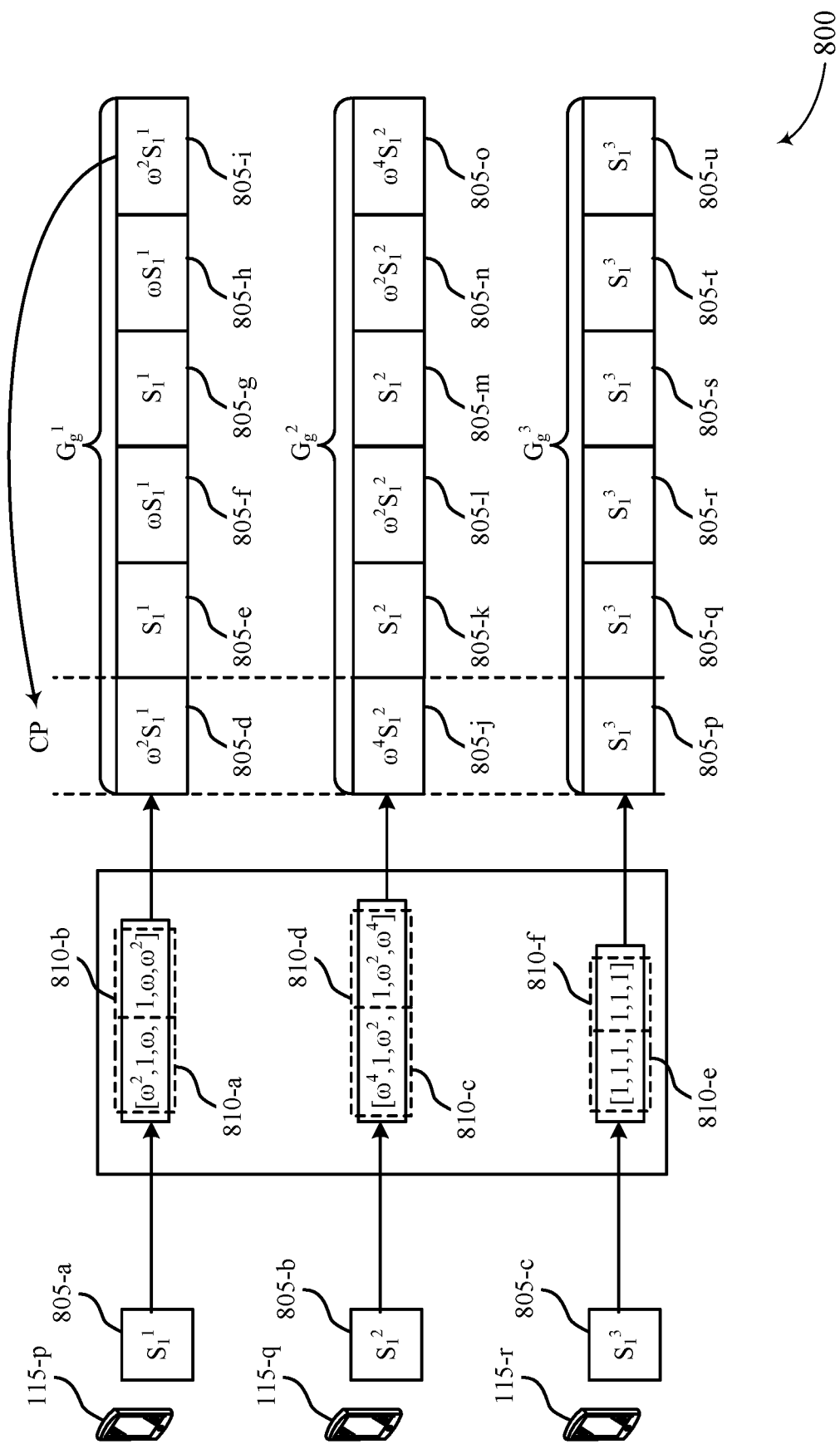

FIG. 8 shows an example of an encoding configuration 800 that supports techniques for increasing NPRACH capacity in accordance with one or more aspects of the present disclosure. The encoding configuration 800 may implement or may be implemented by aspects of the wireless communications system 100 or the wireless communications system 200. For example, the encoding configuration 800 may include a UE 115-p, a UE 115-q, and a UE 115-r, which may each be an example of a UE 115, as described with reference to FIGS. 1 and 2.

In some examples, the NPRACH preambles of one or more UEs 115 may be multiplexed in accordance with the encoding configuration 800. The encoding configuration 800 may use CP information. For example, the NPRACH preamble may include one or more repetitions (e.g., PRUs) and each repetition may include a set of symbol groups. A symbol group may be denoted by $G_g^u$, as described in greater detail with reference to FIG. 3. The symbol group may include a set of symbols used by a UE 115 (e.g., the UE 115-p) for transmitting the NPRACH preamble, and the NPRACH preamble of a UE 115 may be transmitted via the set of symbols, which may be multiplexed with one or more other sets of symbols associated with respective preambles of one or more other UEs 115 (e.g., the 115-q, the UE 115-r). In some cases, instead of prepending the CP to the set of symbols after generating the preamble symbols, a UE 115 may include the CP in the set of symbols for the preamble. That is, the NPRACH preamble for a UE 115 may be multiplexed with preambles of other UEs (e.g., three preambles are multiplexed, and M=3), and a first symbol of the set of symbols may correspond to, or include, the CP. For example, the set of symbols may include a first subset of symbols to which a first OCC is applied and a second subset of symbols to which a second OCC is applied, and the second subset of symbols may include the first symbol corresponding to the CP. The encoding configuration 800 which uses CP information may apply to NPRACH preamble Format 1.

In some cases, the symbol group $G_g^1$ may include the set of symbols including the first subset of symbols to which an OCC 810-b is applied and the second subset of symbols to which an OCC 810-a is applied. The OCC 810-a may include a cyclically shifted version of the OCC 810-b (e.g., may be the OCC 810-b cyclically shifted by one). For example, to accommodate one of the OCC'ed symbols into the CP, the UE 115-p may use a cyclically shifted OCC codeword. The UE 115-p may determine the cyclically shifted OCC codeword based on the CP being included in the set of symbols.

For example, the UE 115-p may apply the first OCC 810-b using a DFT or Hadamard OCC codeword (e.g., conventional, non-cyclically shifted) of length 3 and may apply the second OCC 810-a using a cyclically shifted DFT or Hadamard OCC codeword of length 3, such that the symbol 805-i, which is the last symbol of the first subset of symbols, is the same value as the symbol 805-d, which is the first symbol of the second subset of symbols. Accordingly, the symbol 805-d may satisfy the CP (e.g., of the NPRACH preamble Format 1) because the first symbol 805-d of the set of symbols may include the CP based on applying the cyclically shifted OCC 810-a. In some examples, the first subset of symbols may include the symbol 805-g, the symbol 805-h, and the symbol 805-i. The second subset of symbols may include the symbol 805-d, the symbol 805-e, and the symbol 805-f. The first symbol 805-d of the second subset of symbols may include the CP based on the OCC 810-a.

The OCC 810-b may correspond to a vector $[1,\omega,\omega^2]$ (e.g., a DFT OCC codeword). The UE 115-p may apply a first OCC codeword (e.g., OCC 810-a) to a symbol 805-a which may produce a first subset of symbols (e.g., of OCC'ed symbols) including the symbol 805-g, the symbol 805-h, and the symbol 805-i. To accommodate one of the OCC'ed symbols into the CP, the UE 115-p may cyclically shift the vector $[1,\omega,\omega^2]$ to produce the vector $[\omega^2, 1,\omega,]$, which may correspond to the OCC 810-a. The UE 115-p may apply a second OCC codeword (e.g., OCC 810-b) to a symbol 805-b which may produce a second subset of symbols including a symbol 805-d, a symbol 805-c, and a symbol 805-f. The OCC'ed symbol 805-d may be the same value as the OCC'ed symbol 805-i based on the vector $[\omega^2,1,\omega,]$ being a cyclically shifted version of the vector $[1,\omega,\omega^2]$.

In some examples, the UE 115-q may use the symbol 805-j (e.g., the CP), the symbol 805-k, and the symbol 805-l when the OCC 810-c is applied (e.g., when the OCC 810-c is applied to the symbol 805-b), which may be cyclically shifted from the OCC 810-d. The UE 115-q may further use the symbol 805-m, the symbol 805-n, and the symbol 805-o when the OCC 810-d is applied (e.g., when the OCC 810-d is applied to the symbol 805-b). The UE 115-r may use the symbol 805-p, the symbol 805-q, and the symbol 805-r when the OCC 810-*e* is applied (e.g., when the OCC 810-*e* is applied to the symbol 805-*c*), which may be cyclically shifted from the OCC 810-*f*. The UE 115-*r* may further use the symbol 805-*s*, the symbol 805-*t*, and the symbol 805-*u* when the OCC 810-*f* is applied (e.g., when the OCC 810-*f* is applied to the symbol 805-*c*). The symbol group $G_g''$ may include the set of OCC'ed symbols, which may include the CP (e.g., the symbol 805-*d*, the symbol 805-*j*, the symbol 805-*p*) based on the cyclically shifted OCC codeword.

Each UE 115 may transmit 6/M symbols (e.g., two symbols for three UEs) per symbol group. Each symbol may be OCC'ed into M symbols. Thus, the UE 115 may transmit a total of six OCC'ed symbols in a single symbol group. For example, the UE 115-*p* may transmit the six OCC'ed symbols 805-*d*, 805-*e*, 805-*f*, 805-*g*, 805-*h*, and 805-*i* in the symbol group $G_g^1$. Each UE 115 may transmit $$\frac{6 \times 4}{M}$$

symbols (e.g., 24 OCC'ed symbols) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

Figure 9:
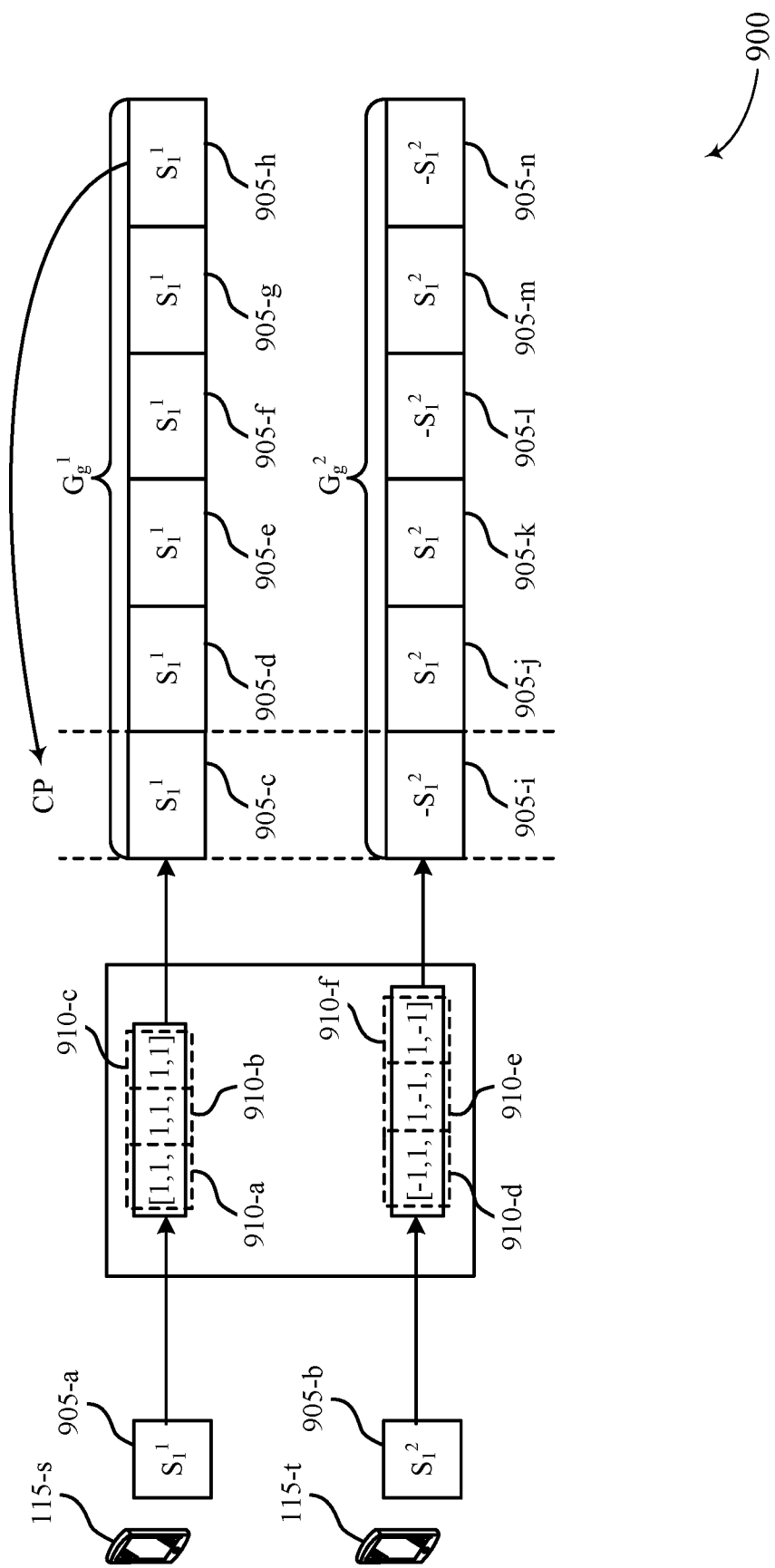

FIG. 9 shows an example of an encoding configuration 900 that supports techniques for increasing NPRACH capacity in accordance with one or more aspects of the present disclosure. The encoding configuration 900 may implement or may be implemented by aspects of the wireless communications system 100 or the wireless communications system 200. For example, the encoding configuration 900 may include a UE 115-*s* and a UE 115-*t*, which may each be an example of a UE 115, as described with reference to FIGS. 1 and 2.

In some examples, the NPRACH preambles of one or more UEs 115 may be multiplexed in accordance with the encoding configuration 900. The encoding configuration 900 may use CP information. For example, the NPRACH preamble may include one or more repetitions (e.g., PRUS) and each repetition may include a set of symbol groups. A symbol group may be denoted by Ga, as described in greater detail with reference to FIG. 3. The symbol group may include a set of symbols used by the UE 115-*s* for transmitting the NPRACH preamble, and the NPRACH preamble of the UE 115-*s* may be transmitted via the set of symbols, which may be multiplexed with another sets of symbols associated with a respective preamble of another UE 115-*t*. In some cases, instead of prepending the CP to the set of symbols after generating the preamble symbols, a UE 115 may include the CP in the set of symbols for the preamble. That is, the NPRACH preamble for a UE 115 may be multiplexed with preambles of other UEs (e.g., two preambles are multiplexed, and M=2), and a first symbol of the set of symbols may correspond to, or include, the CP. For example, the set of symbols may include a first subset of symbols to which a first OCC 910 is applied and a second subset of symbols to which a second OCC 910 is applied, and the second subset of symbols may include the first symbol corresponding to the CP. The encoding configuration 900 which uses CP information may apply to NPRACH preamble Format 1.

In some cases, the set of symbols may include two or more copies of the first subset of symbols to which the first OCC 910 is applied. For example, the symbol group $G_g^1$ may include the set of symbols including a first copy of the first subset of symbols to which an OCC 910-*a* is applied and a second copy of the first subset of symbols to which a copy of the OCC 910-*a* (e.g., OCC 910-*b*) is applied. The OCC 910-*b* may be the same as the OCC 910-*a* because the OCC 910-*b* may be a copy of the OCC 910-*a*. In some examples, the set of symbols may include the symbol 905-*e* and the symbol 905-*f* (e.g., a first copy of the first subset of symbols), to which the OCC 910-*b* is applied using a symbol 905-*a*, and may include the symbol 905-*g* and the symbol 905-*h* (e.g., a second copy of the first subset of symbols), to which the OCC 910-*c* is applied. The UE 115-*s* may apply the first copy of the OCC, the OCC 910-*b*, using a Hadamard or DFT OCC codeword of length 2, and may apply the second copy of the OCC, the OCC 910-*c*, using a Hadamard or DFT OCC codeword of length 2 the same as the OCC 910-*b*.

The set of symbols may also include the second subset of symbols to which an OCC 910-*a* is applied. The OCC 910-*a* may include a cyclically shifted version of the OCC 910-*b* (e.g., may be the OCC 910-*b* cyclically shifted by one), as described in greater detail with reference to FIG. 9. For example, to accommodate one of the OCC'ed symbols into the CP, the UE 115-*s* may use a cyclically shifted OCC codeword. The UE 115-*s* may determine the cyclically shifted OCC codeword based on the CP being included in the set of symbols.

In some examples, the UE 115-*t* may use the symbol 905-*i* (e.g., the CP) and the symbol 905-*j* when the OCC 910-*d* is applied (e.g., when the OCC 910-*d* is applied to the symbol 905-*b*), which may be cyclically shifted from the OCC 910-*e*. The UE 115-*t* may further use the symbol 905-*k* and symbol 905-*l* when the OCC 910-*e* is applied (e.g., when the OCC 910-*e* is applied to the symbol 905-*b*) and may use the symbol 905-*m* and the symbol 905-*n* when the OCC 910-*f* is applied (e.g., when the OCC 910-*f* is applied to the symbol 905-*b*), which may be a copy of the OCC 910-*e*. The symbol group Ga may include the set of OCC'ed symbols, which may include the CP (e.g., symbol 905-*c*, the symbol 905-*i*) based on the cyclically shifted OCC codeword.

Each UE 115 may transmit 6/M symbols (e.g., three symbols for two UEs) per symbol group. Each symbol may be OCC'ed into M symbols. Thus, the UE 115 may transmit a total of six OCC'ed symbols in a single symbol group. For example, the UE 115-*s* may transmit the six OCC'ed symbols 905-*c*, 905-*d*, 905-*e*, 905-*f*, 905-*g*, and 905-*h* in the symbol group $G_g^1$. Each UE 115 may transmit $$\frac{6 \times 4}{M}$$

symbols (e.g., 24 OCC'ed symbols) per PRU, since each PRU includes four symbol groups. In some cases, a UE 115 may combine multiple PRUs, which may support improved estimation or detection results. The UE 115 may determine how many PRUs to combine based on a capability of the UE 115 to maintain phase coherence for some duration.

Figure 10:
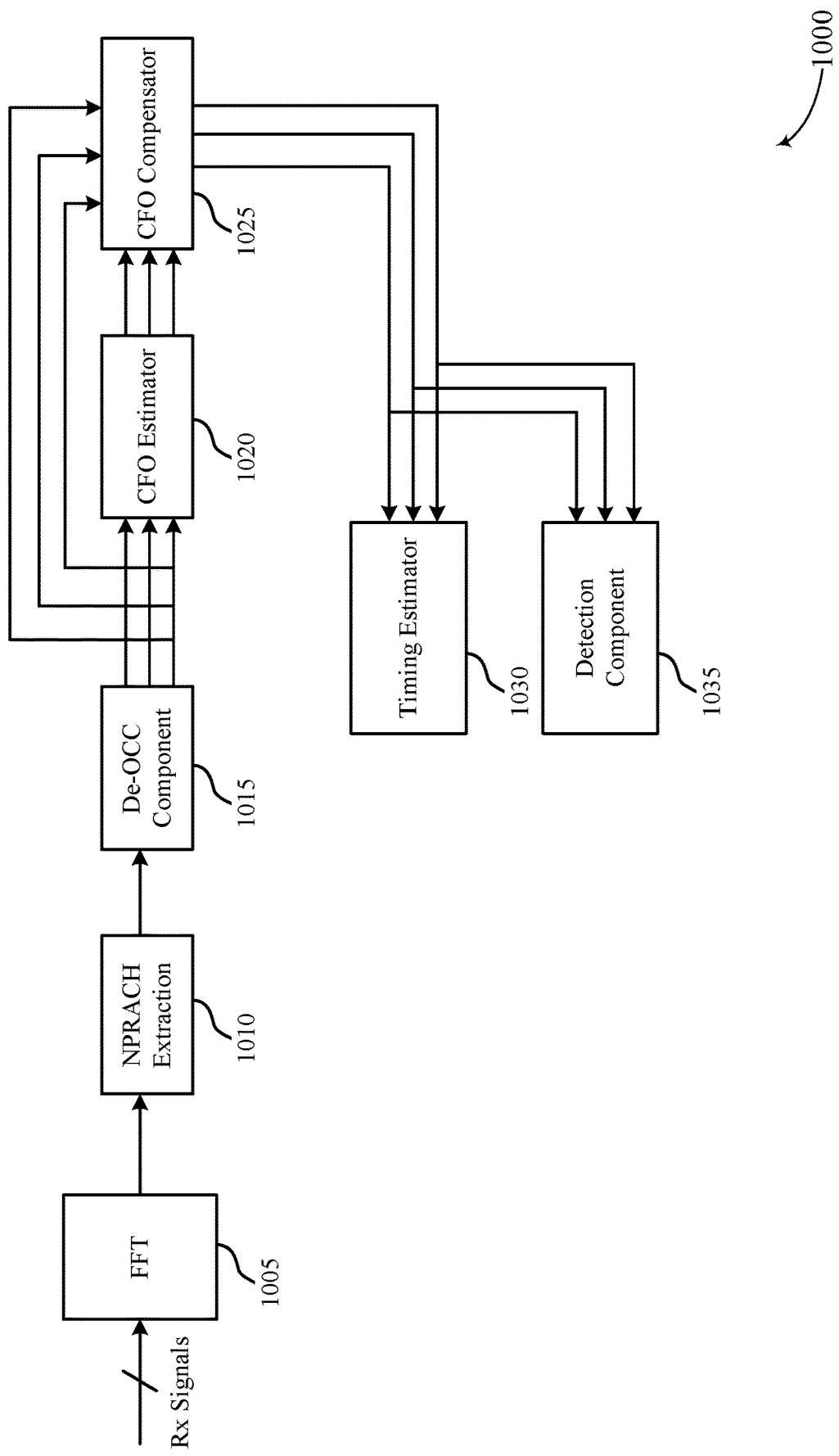
FIG. 10 shows an example of a receiver architecture that supports techniques for increasing NPRACH capacity in accordance with one or more aspects of the present disclosure.

FIG. 10 shows an example of a receiver architecture 1000 that supports techniques for increasing NPRACH capacity in accordance with one or more aspects of the present disclosure. The receiver architecture 1000 may implement or may be implemented by aspects of the wireless communications system 100 or the wireless communications system 200. For example, the receiver architecture 1000 may be implemented by a network entity 105, as described with reference to FIGS. 1 and 2.

In some examples, a network entity 105 may include a Fast Fourier Transform (FFT) component 1005. The FFT component 1005 may use, as an input, receive (Rx) signals (e.g., from a UE 115) and may output the FFT of the Rx signals. The FFT of the Rx signals may be input into an NPRACH extraction component 1010 of the network entity 105, which may output an OCC'ed NPRACH. The OCC'ed NPRACH may include NPRACH preambles of multiple UEs 115 multiplexed, as described in greater detail with reference to FIG. 3.

In some cases, the network entity 105 may include a de-OCC component 1015 which may determine the respective NPRACH (e.g., NPRACH preamble) for each of multiple UEs 115 multiplexed in an NPRACH based on OCCs (e.g., OCC'ed symbols) for each preamble. The techniques described herein for increasing NPRACH capacity may be based on the network entity 105 including the de-OCC component 1015. For example, a UE 115 may use one or more OCCs for transmitting the NPRACH preamble based on a capability of the network entity 105 to decode the OCCs using the de-OCC component 1015 or based on the network entity 105 including the de-OCC component 1015.

The network entity 105 may include a CFO estimator 1020 which may use, as an input, the NPRACH preambles for the multiple UEs 115 and may output a CFO for each UE 115. The network entity 105 may input the CFO for each UE 115 (e.g., output by the CFO estimator) and the NPRACH per UE (e.g., output by the De-OCC component 1015) into a CFO compensator 1025 of the network entity 105, which may output a CFO compensated NPRACH per UE. The network entity 105 may include a timing estimator 1030 which may use, as an input, the CFO compensated NPRACH per UE and may output a timing estimate per UE. The network entity 105 may also include a detection component 1035 which may use, as in input, the CFO compensated NPRACH per UE and may output a declare detection per UE. The network entity 105 may not be limited by the receiver architecture 1000 and may include additional elements or components not shown. The receiver architecture 1000 may implement any of the techniques described herein and may not be limited by NPRACH preamble formats (e.g., Format 0, Format 1) or OCC configurations described herein.

Figure 11:
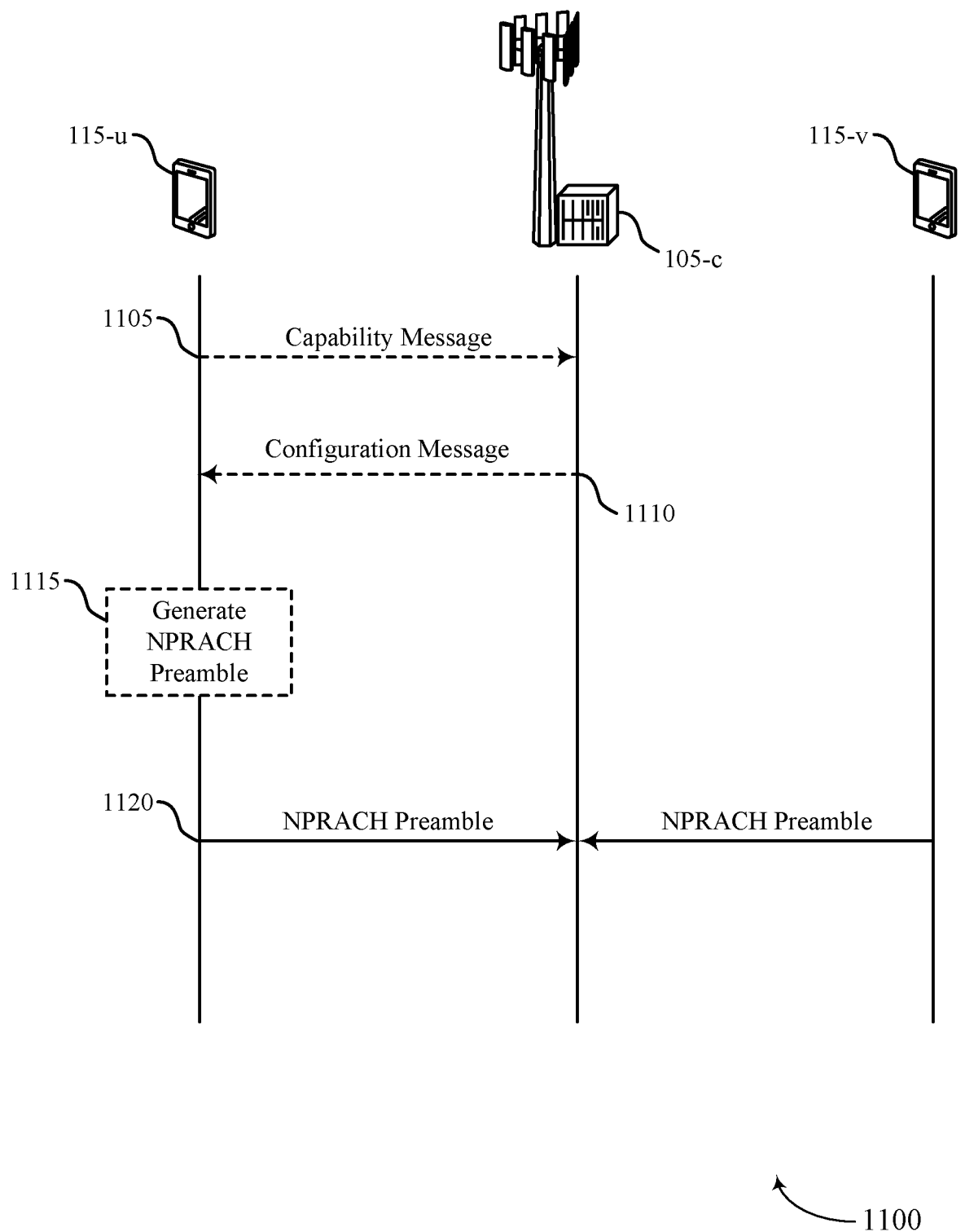
FIG. 11 shows an example of a process flow that supports techniques for increasing NPRACH capacity in accordance with one or more aspects of the present disclosure.

FIG. 11 shows an example of a process flow 1100 that supports techniques for increasing NPRACH capacity in accordance with one or more aspects of the present disclosure. The process flow 1100 may implement or may be implemented by aspects of the wireless communications system 100 or the wireless communications system 200. For example, the process flow 1100 may include a UE 115-*u*, a UE 115-*v*, and a network entity 105-*c*, which may be examples of corresponding devices and entities as described with reference to FIGS. 1 and 2. In the following description of the process flow 1100, the operations between the UE 115-*u*, the UE 115-*v*, and the network entity 105-*c* may be transmitted in a different order than the example order shown, or the operations performed by the UE 115-*u*, the UE 115-*v*, and the network entity 105-*c* may be performed in different orders or at different times. Some operations may also be omitted from the process flow 1100, and other operations may be added to the process flow 1100.

At 1105, the UE 115-*u* may transmit a capability message indicating a capability of the UE 115-*u* to support NPRACH multiplexing. The capability of the UE 115-*u* for NPRACH multiplexing may be based on phase coherence capabilities associated with the UE 115-*u*, and the capability message may indicate a phase coherence capability of the UE 115-*u*.

At 1110, the UE 115-*u* may receive a configuration message indicating a configuration of the NPRACH preamble. The network entity 105-*c* may receive the configuration message via RRC, MAC-CE, system information, or other signaling that may configure the UE 115-*u* with one or more preambles to transmit. The configuration message may include UE specific configuration information regarding an NPRACH orthogonal cover coding configuration to be used for transmitting the NPRACH preamble. For example, the configuration message may include a multiplexing order M (e.g., quantity of UEs or quantity of preambles to be multiplexed). The multiplexing order M may be based on a phase coherence capability reported from the UE 115-*u*. The configuration message may indicate a configuration of one or more candidate configurations (e.g., using an index). The configuration message may assign an OCC codeword to the UE 115-*u* for multiplexing, or the configuration message may indicate one or more OCCs including the OCC to be used by the UE 115-*u* for multiplexing. In some examples, the UE 115-*u* may receive the configuration message via a system information block.

At 1115, the UE 115-*u* may generate an NPRACH preamble for each symbol group of a set of symbol groups based on a format of the NPRACH preamble (e.g., Format 0, Format 1) and based on a quantity of the one or more other UEs (e.g., a multiplexing order, M) multiplexed with the UE. The UE 115-*u* may generate the NPRACH preamble based on the configuration message received from the network entity 105-*c*. Each symbol group of the set of symbol groups may include a set of symbols used by the UE 115-*u* for transmitting the NPRACH preamble. The set of symbols may include a subset of symbols to which an OCC is applied. In some cases, the UE 115-*u* may determine a quantity of symbols of the subset of symbols based on the quantity of the one or more other UEs (e.g., a multiplexing order, M) multiplexed (e.g., sharing time or frequency resources) with the UE 115-*u*, and the UE 115-*u* may generate the NPRACH preamble based on the quantity of symbols. In some examples, the UE 115-*u* may prepend a CP to each symbol group of the set of symbol groups. In other examples, the set of symbols may include a second subset of symbols to which a second OCC is applied, and the second subset of symbols may include a first symbol corresponding to the CP.

At 1120, the UE 115-*u* may perform an access procedure for establishing a connection with the network entity 105-*c*. As part of the access procedure, the UE 115-*u* may transmit one or more repetitions (e.g., PRUs) of the NPRACH preamble to the network entity 105-*c*. Each repetition of the one or more repetitions may include the set of symbols groups, and each symbol group of the set of symbol groups may include a set of symbols used by the UE 115-*u* for transmitting the NPRACH preamble. The set of symbols may be multiplexed with another set of symbols associated with a respective preamble of the UE 115-*v*.

Figure 12:
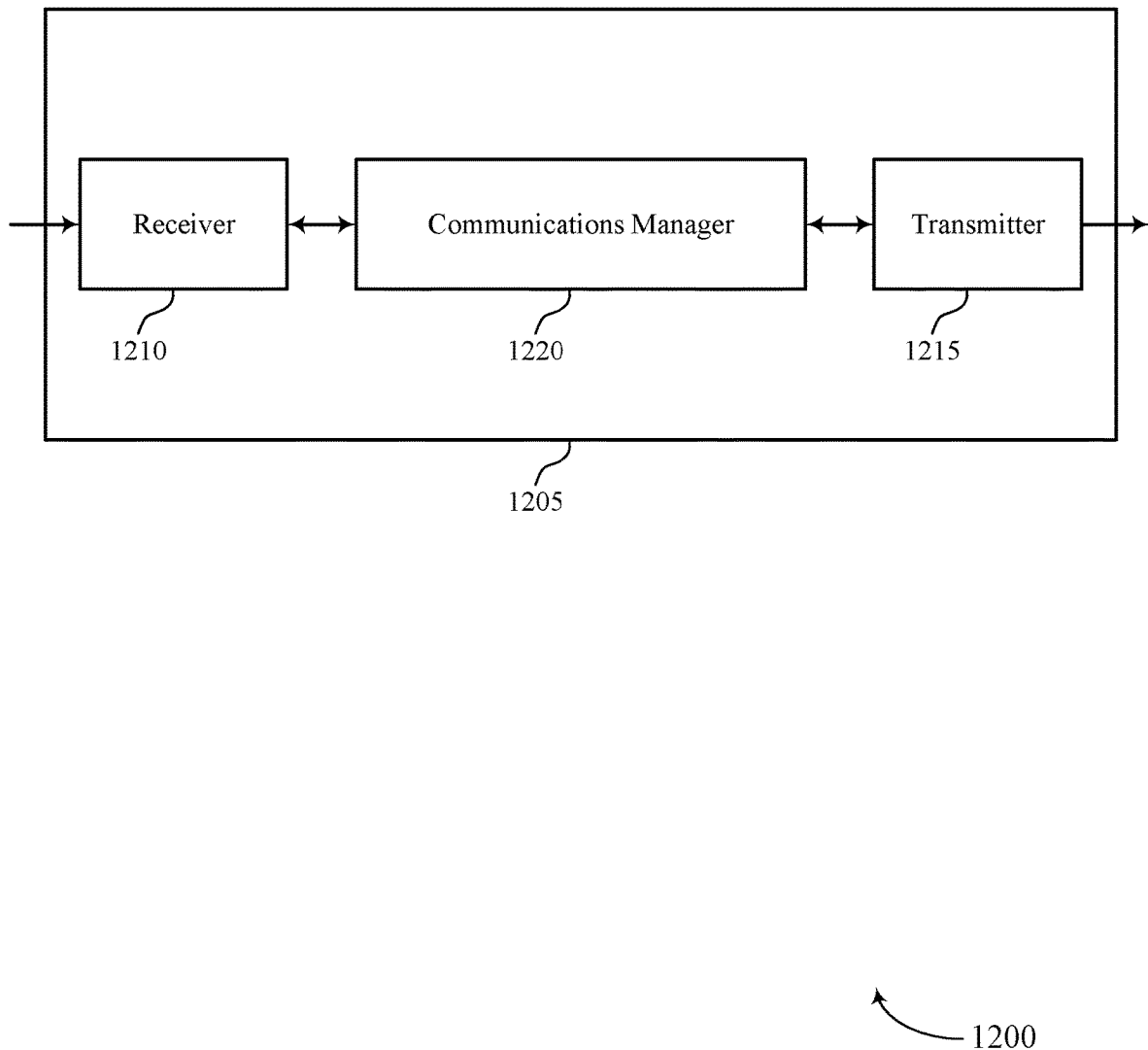
FIGS. 12 and 13 show block diagrams of devices that support techniques for increasing NPRACH capacity in accordance with one or more aspects of the present disclosure.

FIG. 12 shows a block diagram 1200 of a device 1205 that supports techniques for increasing NPRACH capacity in accordance with one or more aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for increasing NPRACH capacity). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for increasing NPRACH capacity). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for increasing NPRACH capacity as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. For example, the communications manager 1220 is capable of, configured to, or operable to support a means for performing an access procedure for establishing a connection with a network entity. The communications manager 1220 is capable of, configured to, or operable to support a means for transmitting, as part of the access procedure, one or more repetitions of an NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for more efficient utilization of communication resources by sharing time-frequency resources of an NPRACH with other UEs through multiplexing. For example, by multiplexing symbol groups of NPRACH preambles, the device 1205 may support an increased capacity of the NPRACH, and the NPRACH may support an increased quantity of UEs at a given time.

Figure 13:
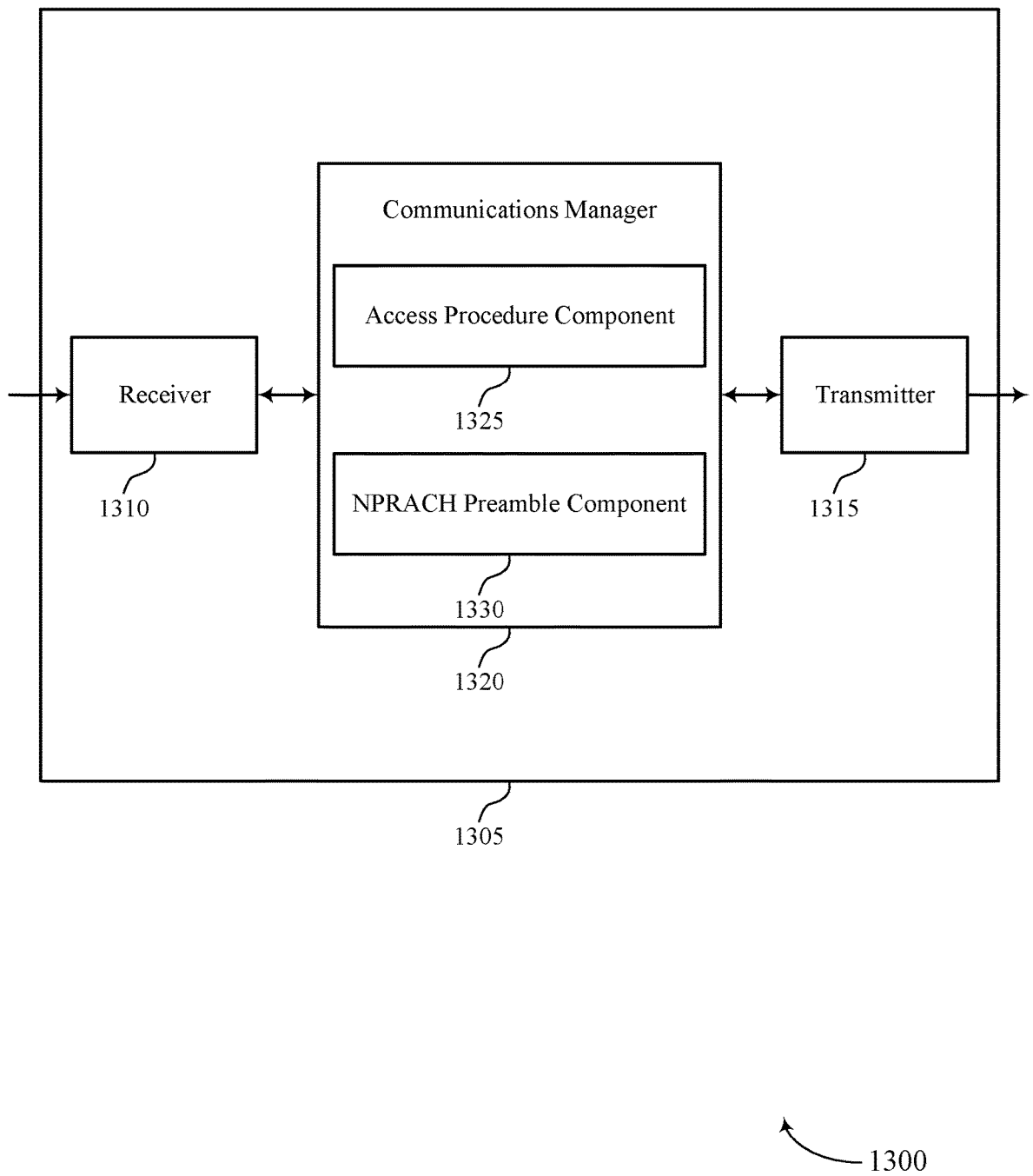

FIG. 13 shows a block diagram 1300 of a device 1305 that supports techniques for increasing NPRACH capacity in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for increasing NPRACH capacity). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for increasing NPRACH capacity). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for increasing NPRACH capacity as described herein. For example, the communications manager 1320 may include an access procedure component 1325, an NPRACH preamble component 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a UE in accordance with examples as disclosed herein. The access procedure component 1325 is capable of, configured to, or operable to support a means for performing an access procedure for establishing a connection with a network entity. The NPRACH preamble component 1330 is capable of, configured to, or operable to support a means for transmitting, as part of the access procedure, one or more repetitions of an NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

Figure 14:
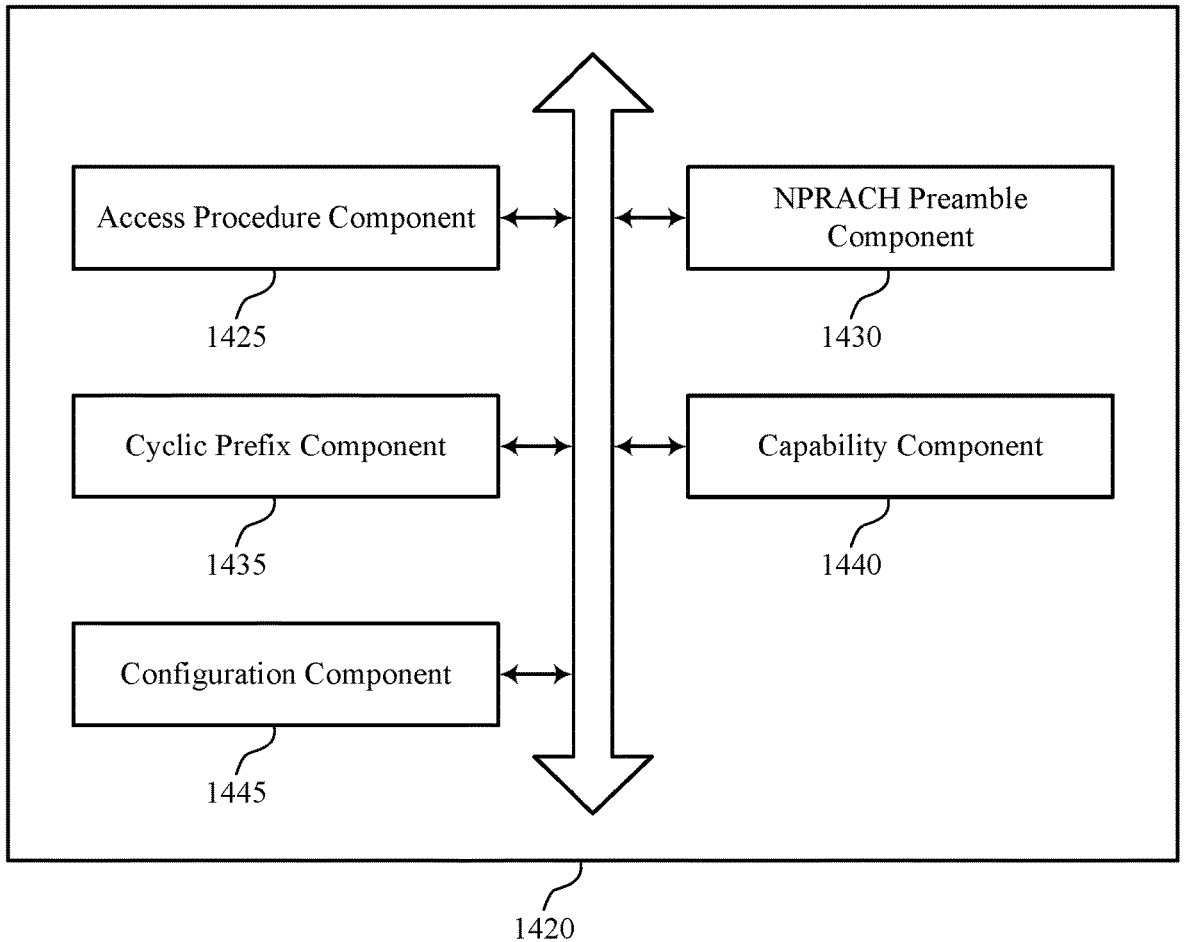
FIG. 14 shows a block diagram of a communications manager that supports techniques for increasing NPRACH capacity in accordance with one or more aspects of the present disclosure.

FIG. 14 shows a block diagram 1400 of a communications manager 1420 that supports techniques for increasing NPRACH capacity in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for increasing NPRACH capacity as described herein. For example, the communications manager 1420 may include an access procedure component 1425, an NPRACH preamble component 1430, a cyclic prefix component 1435, a capability component 1440, a configuration component 1445, or any combination thereof. Each of these components may communicate, directly or indirectly, with one another (e.g., via one or more buses).

The communications manager 1420 may support wireless communications at a UE in accordance with examples as disclosed herein. The access procedure component 1425 is capable of, configured to, or operable to support a means for performing an access procedure for establishing a connection with a network entity. In some examples, the NPRACH preamble component 1430 is capable of, configured to, or operable to support a means for transmitting, as part of the access procedure, one or more repetitions of an NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

In some examples, the NPRACH preamble component 1430 is capable of, configured to, or operable to support a means for generating the NPRACH preamble for each symbol group of the set of symbol groups based on a format of the NPRACH preamble and a quantity of the one or more other UEs multiplexed with the UE. In some examples, the cyclic prefix component 1435 is capable of, configured to, or operable to support a means for prepending a CP to each symbol group of the set of symbol groups.

In some examples, the NPRACH preamble component 1430 is capable of, configured to, or operable to support a means for determining a quantity of symbols of the subset of symbols for transmitting the NPRACH preamble, where the quantity of symbols is based on the quantity of the one or more other UEs multiplexed with the UE, and where the NPRACH preamble is generated based on the quantity of symbols.

In some examples, the set of symbols includes the subset of symbols and zero or more empty symbols different from the subset of symbols. In some examples, the set of symbols includes two or more copies of the subset of symbols and one or more empty symbols different from the subset of symbols. In some examples, the OCC is applied to each copy of the two or more copies. In some examples, the set of symbols includes a second subset of symbols to which a second OCC is applied.

In some examples, the NPRACH preamble component 1430 is capable of, configured to, or operable to support a means for generating the NPRACH preamble for each symbol group of the set of symbol groups based on a format of the NPRACH preamble and a quantity of the one or more other UEs multiplexed with the UE, where the set of symbols includes a second subset of symbols to which a second OCC is applied, and the second subset of symbols includes a first symbol corresponding to a CP.

In some examples, the NPRACH preamble component 1430 is capable of, configured to, or operable to support a means for determining a quantity of symbols of the subset of symbols for transmitting the NPRACH preamble, where the quantity of symbols is based on the quantity of the one or more other UEs multiplexed with the UE and based on the second subset of symbols comprising the first symbol corresponding to the cyclic prefix. In some examples, the cyclic prefix component 1435 is capable of, configured to, or operable to support a means for determining a cyclically-shifted OCC codeword based on the CP being included in the set of symbols, where the OCC is applied to the subset of symbols using the cyclically-shifted OCC codeword.

In some examples, the set of symbols includes one or more copies of the subset of symbols to which the OCC is applied and the second subset of symbols to which the second OCC is applied, the second OCC including a cyclically-shifted version of the OCC. In some examples, a last symbol of the subset of symbols is the same as the first symbol of the second subset of symbols corresponding to the cyclic prefix, where the first symbol of the second subset of symbols is based on the second OCC. In some examples, the format of the NPRACH preamble is format 1.

In some examples, the capability component 1440 is capable of, configured to, or operable to support a means for transmitting a capability message indicating a capability of the UE to support NPRACH preamble multiplexing. In some examples, the capability message indicates a phase coherence capability of the UE.

In some examples, the configuration component 1445 is capable of, configured to, or operable to support a means for receiving a configuration message indicating a configuration of the NPRACH preamble, where transmitting the one or more repetitions of the NPRACH preamble is based on the configuration. In some examples, the configuration message indicates one or more OCCs including the OCC. In some examples, the configuration message is received via system information (e.g., via a system information block).

Figure 15:
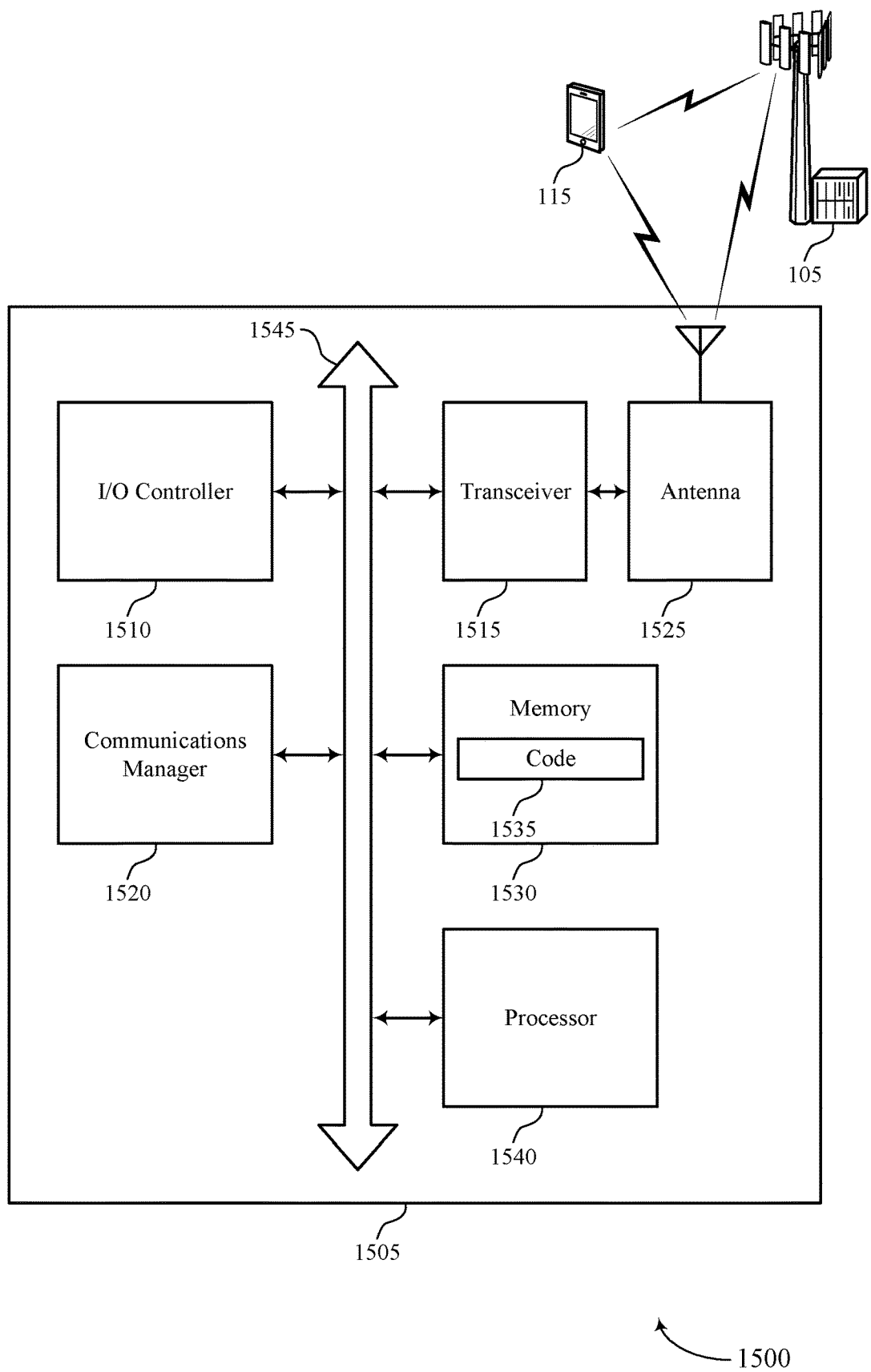
FIG. 15 shows a diagram of a system including a device that supports techniques for increasing NPRACH capacity in accordance with one or more aspects of the present disclosure.

FIG. 15 shows a diagram of a system 1500 including a device 1505 that supports techniques for increasing NPRACH capacity in accordance with one or more aspects of the present disclosure. The device 1505 may be an example of or include the components of a device 1205, a device 1305, or a UE 115 as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for increasing NPRACH capacity). For example, the device 1505 or a component of the device 1505 may include a processor 1540 and memory 1530 coupled with or to the processor 1540, the processor 1540 and memory 1530 configured to perform various functions described herein.

The communications manager 1520 may support wireless communications at a UE in accordance with examples as disclosed herein. For example, the communications manager 1520 is capable of, configured to, or operable to support a means for performing an access procedure for establishing a connection with a network entity. The communications manager 1520 is capable of, configured to, or operable to support a means for transmitting, as part of the access procedure, one or more repetitions of an NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs.

By including or configuring the communications manager 1520 in accordance with examples as described herein, the device 1505 may support techniques for reduced latency by reducing wait times associated with an NPRACH being unavailable. For example, the device 1505 may support an increased quantity of transmission opportunities at a given time over the NPRACH by increasing a capacity of the NPRACH, which may support reduced latencies and improve user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for increasing NPRACH capacity as described herein, or the processor 1540 and the memory 1530 may be otherwise configured to perform or support such operations.

Figure 16:
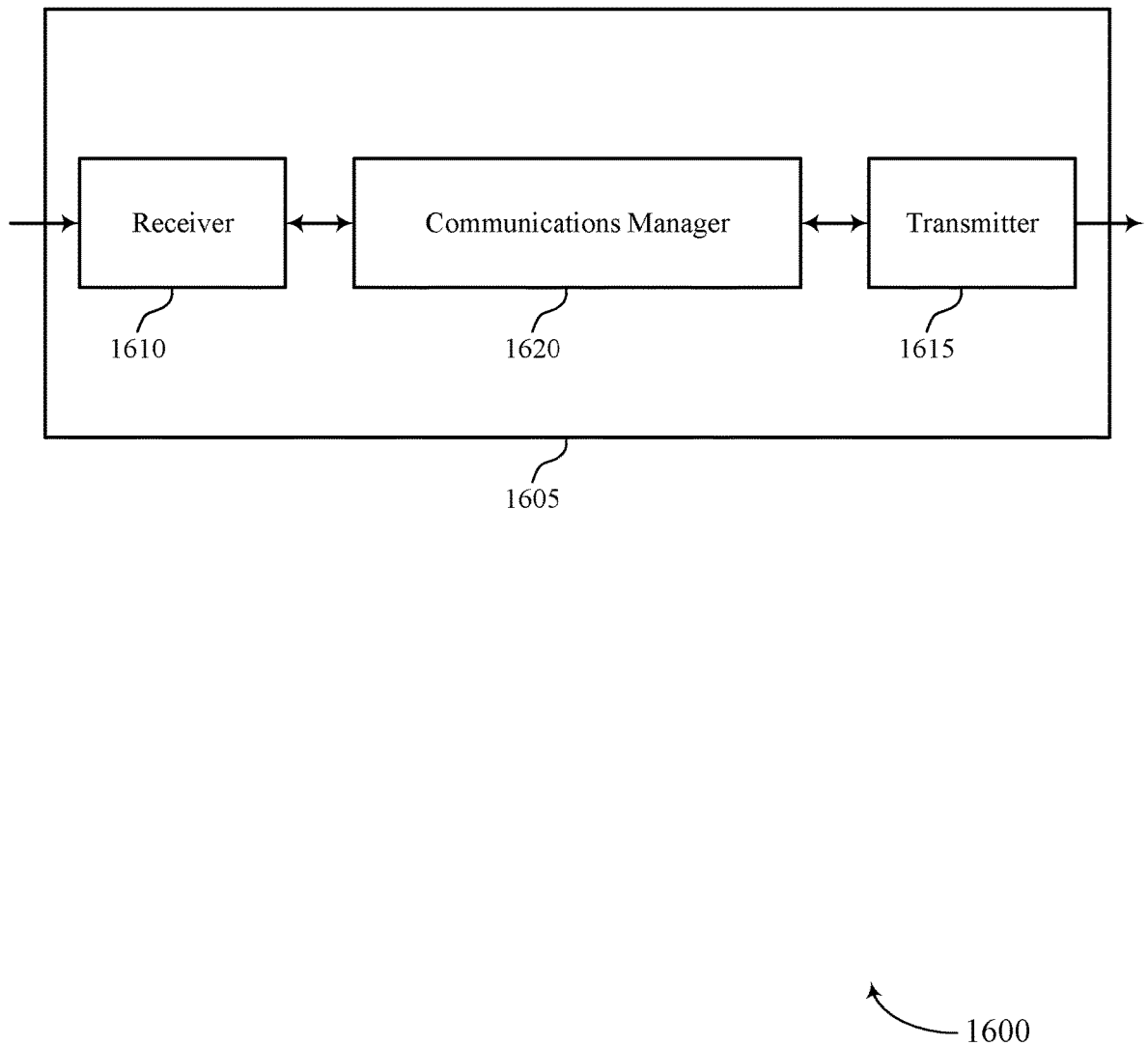
FIGS. 16 and 17 show block diagrams of devices that support techniques for increasing NPRACH capacity in accordance with one or more aspects of the present disclosure.

FIG. 16 shows a block diagram 1600 of a device 1605 that supports techniques for increasing NPRACH capacity in accordance with one or more aspects of the present disclosure. The device 1605 may be an example of aspects of a network entity 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas. Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

The communications manager 1620, the receiver 1610, the transmitter 1615, or various combinations thereof or various components thereof may be examples of means for performing various aspects of techniques for increasing NPRACH capacity as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1620 may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communications at a network entity in accordance with examples as disclosed herein. For example, the communications manager 1620 is capable of, configured to, or operable to support a means for performing an access procedure for establishing a connection with a UE. The communications manager 1620 is capable of, configured to, or operable to support a means for receiving, as part of the access procedure, one or more repetitions of an NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

By including or configuring the communications manager 1620 in accordance with examples as described herein, the device 1605 (e.g., a processor controlling or otherwise coupled with the receiver 1610, the transmitter 1615, the communications manager 1620, or a combination thereof) may support techniques for more efficient utilization of communication resources by sharing time-frequency resources of an NPRACH with other UEs through multiplexing. For example, by multiplexing symbol groups of NPRACH preambles, the device 1605 may support an increased capacity of the NPRACH, and the NPRACH may support an increased quantity of UEs at a given time.

Figure 17:
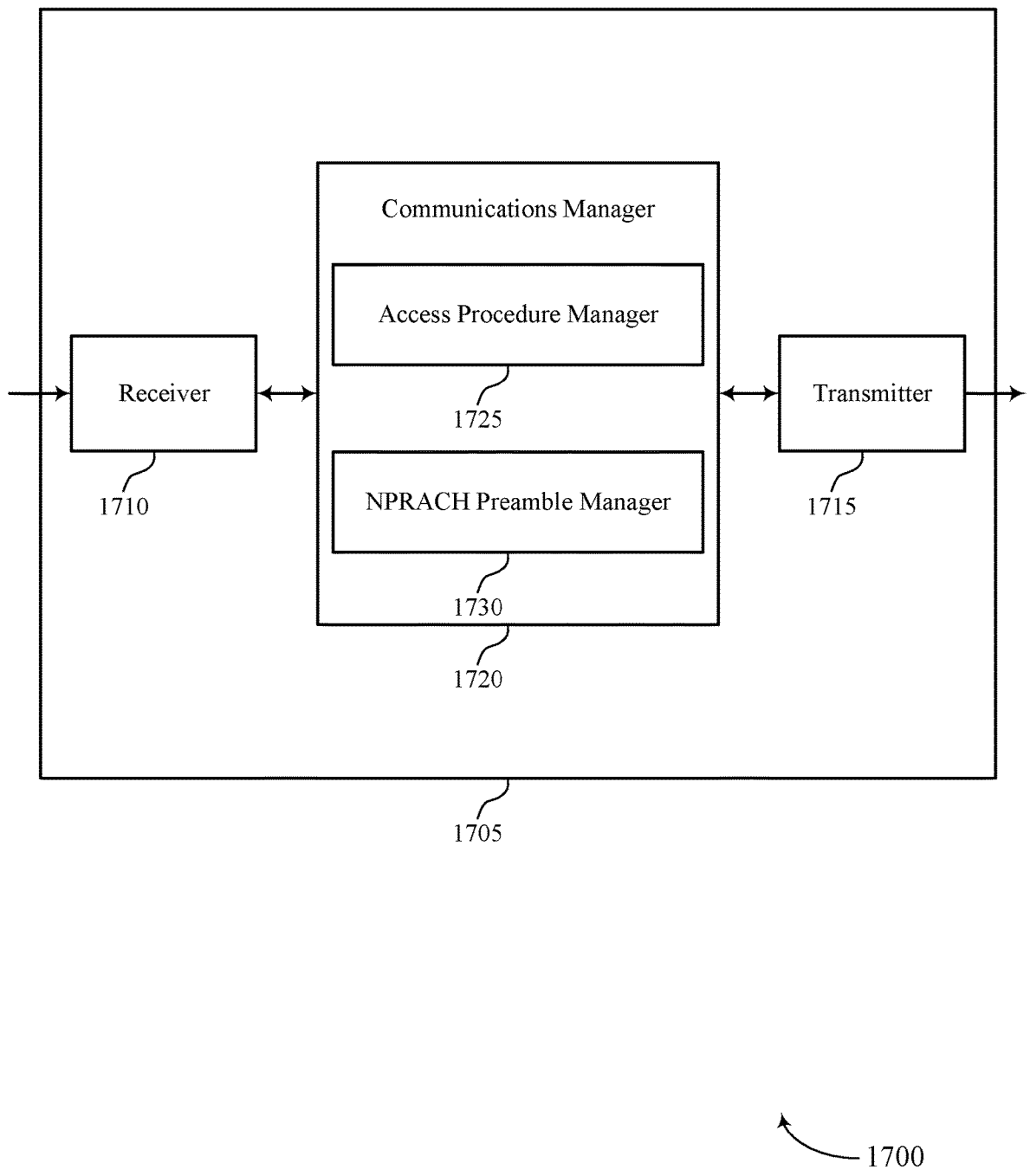

FIG. 17 shows a block diagram 1700 of a device 1705 that supports techniques for increasing NPRACH capacity in accordance with one or more aspects of the present disclosure. The device 1705 may be an example of aspects of a device 1605 or a network entity 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The device 1705, or various components thereof, may be an example of means for performing various aspects of techniques for increasing NPRACH capacity as described herein. For example, the communications manager 1720 may include an access procedure manager 1725, an NPRACH preamble manager 1730, or any combination thereof. The communications manager 1720 may be an example of aspects of a communications manager 1620 as described herein. In some examples, the communications manager 1720, or various components thereof, may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communications at a network entity in accordance with examples as disclosed herein. The access procedure manager 1725 is capable of, configured to, or operable to support a means for performing an access procedure for establishing a connection with a UE. The NPRACH preamble manager 1730 is capable of, configured to, or operable to support a means for receiving, as part of the access procedure, one or more repetitions of an NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

Figure 18:
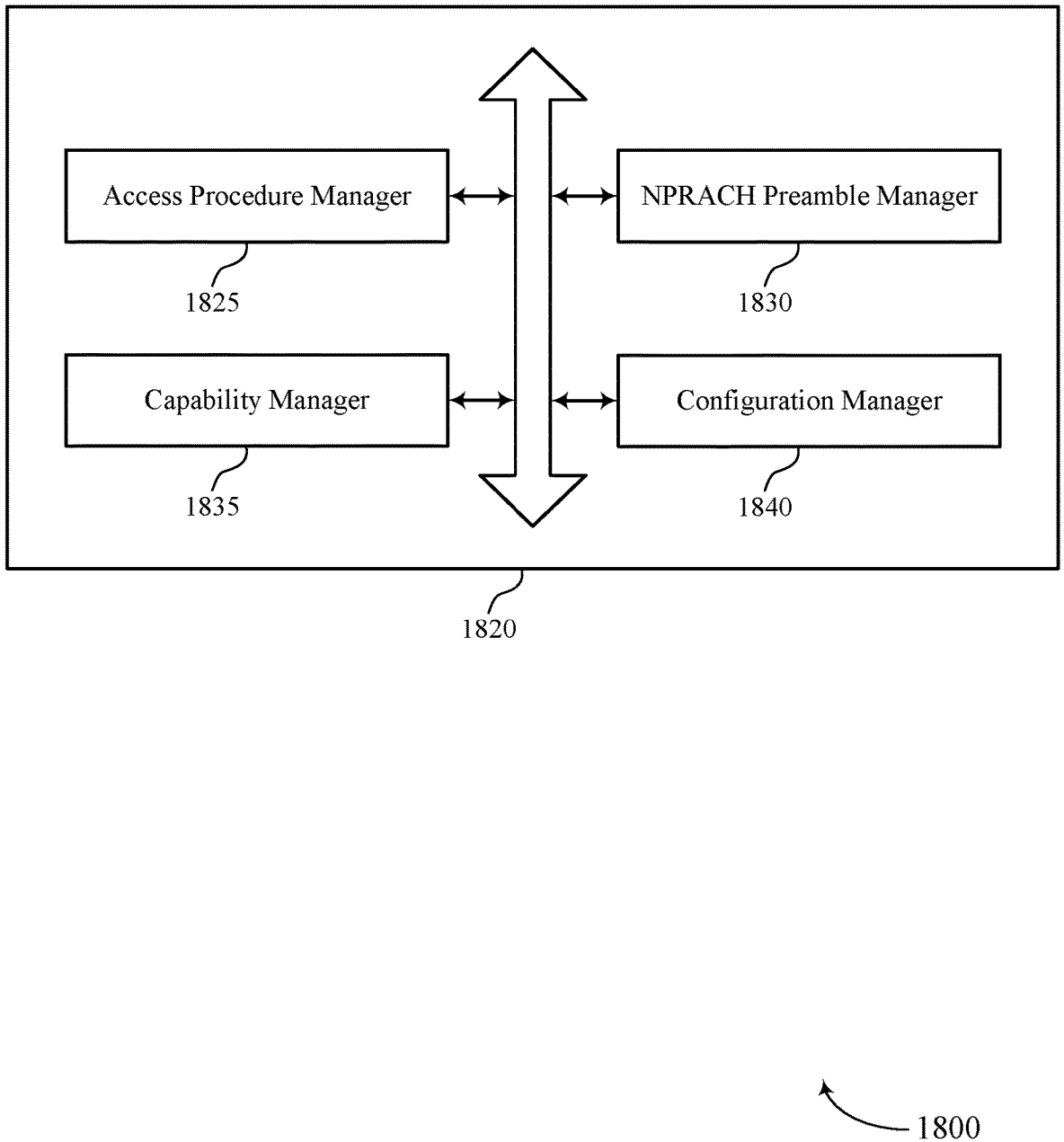
FIG. 18 shows a block diagram of a communications manager that supports techniques for increasing NPRACH capacity in accordance with one or more aspects of the present disclosure.

FIG. 18 shows a block diagram 1800 of a communications manager 1820 that supports techniques for increasing NPRACH capacity in accordance with one or more aspects of the present disclosure. The communications manager 1820 may be an example of aspects of a communications manager 1620, a communications manager 1720, or both, as described herein. The communications manager 1820, or various components thereof, may be an example of means for performing various aspects of techniques for increasing NPRACH capacity as described herein. For example, the communications manager 1820 may include an access procedure manager 1825, an NPRACH preamble manager 1830, a capability manager 1835, a configuration manager 1840, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1820 may support wireless communications at a network entity in accordance with examples as disclosed herein. The access procedure manager 1825 is capable of, configured to, or operable to support a means for performing an access procedure for establishing a connection with a UE. In some examples, the NPRACH preamble manager 1830 is capable of, configured to, or operable to support a means for receiving, as part of the access procedure, one or more repetitions of an NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

In some examples, the NPRACH preamble for each symbol group of the set of symbol groups is based on a format of the NPRACH preamble and a quantity of the one or more other UEs multiplexed with the UE. In some examples, a CP is prepended to each symbol group of the set of symbol groups. In some examples, a quantity of symbols of the subset of symbols for the NPRACH preamble is based on the quantity of the one or more other UEs multiplexed with the UE.

In some examples, the set of symbols includes the subset of symbols and zero or more empty symbols different from the subset of symbols. In some examples, the set of symbols includes two or more copies of the subset of symbols and one or more empty symbols different from the subset of symbols. In some examples, the OCC is applied to each copy of the two or more copies. In some examples, the set of symbols includes a second subset of symbols to which a second OCC is applied.

In some examples, the NPRACH preamble for each symbol group of the set of symbol groups is based on a format of the NPRACH preamble and a quantity of the one or more other UEs multiplexed with the UE. In some examples, the set of symbols includes a second subset of symbols to which a second OCC is applied, and the second subset of symbols includes a first symbol corresponding to a CP.

In some examples, a quantity of symbols of the subset of symbols for transmitting the NPRACH preamble is based on the quantity of the one or more other UEs multiplexed with the UE and based on the second subset of symbols comprising the first symbol corresponding to the cyclic prefix. In some examples, the OCC is applied to the subset of symbols using a cyclically-shifted OCC codeword based on the CP being included in the set of symbols.

In some examples, the set of symbols includes one or more copies of the subset of symbols to which the OCC is applied and the second subset of symbols to which the second OCC is applied, the second OCC including a cyclically-shifted version of the OCC. In some examples, a last symbol of the subset of symbols is the same as the first symbol of the second subset of symbols corresponding to the cyclic prefix, where the first symbol of the second subset of symbols is based on the second OCC. In some examples, the one or more repetitions of the NPRACH preamble are combined. In some examples, the access procedure is based on a combination of the one or more repetitions.

In some examples, the capability manager 1835 is capable of, configured to, or operable to support a means for receiving a capability message indicating a capability of the UE to support NPRACH preamble multiplexing.

In some examples, the configuration manager 1840 is capable of, configured to, or operable to support a means for transmitting a configuration message indicating a configuration of the NPRACH preamble, where receiving the one or more repetitions of the NPRACH preamble is based on the configuration. In some examples, the configuration message indicates one or more OCCs including the OCC. In some examples, the configuration message is transmitted via a system information block.

Figure 19:
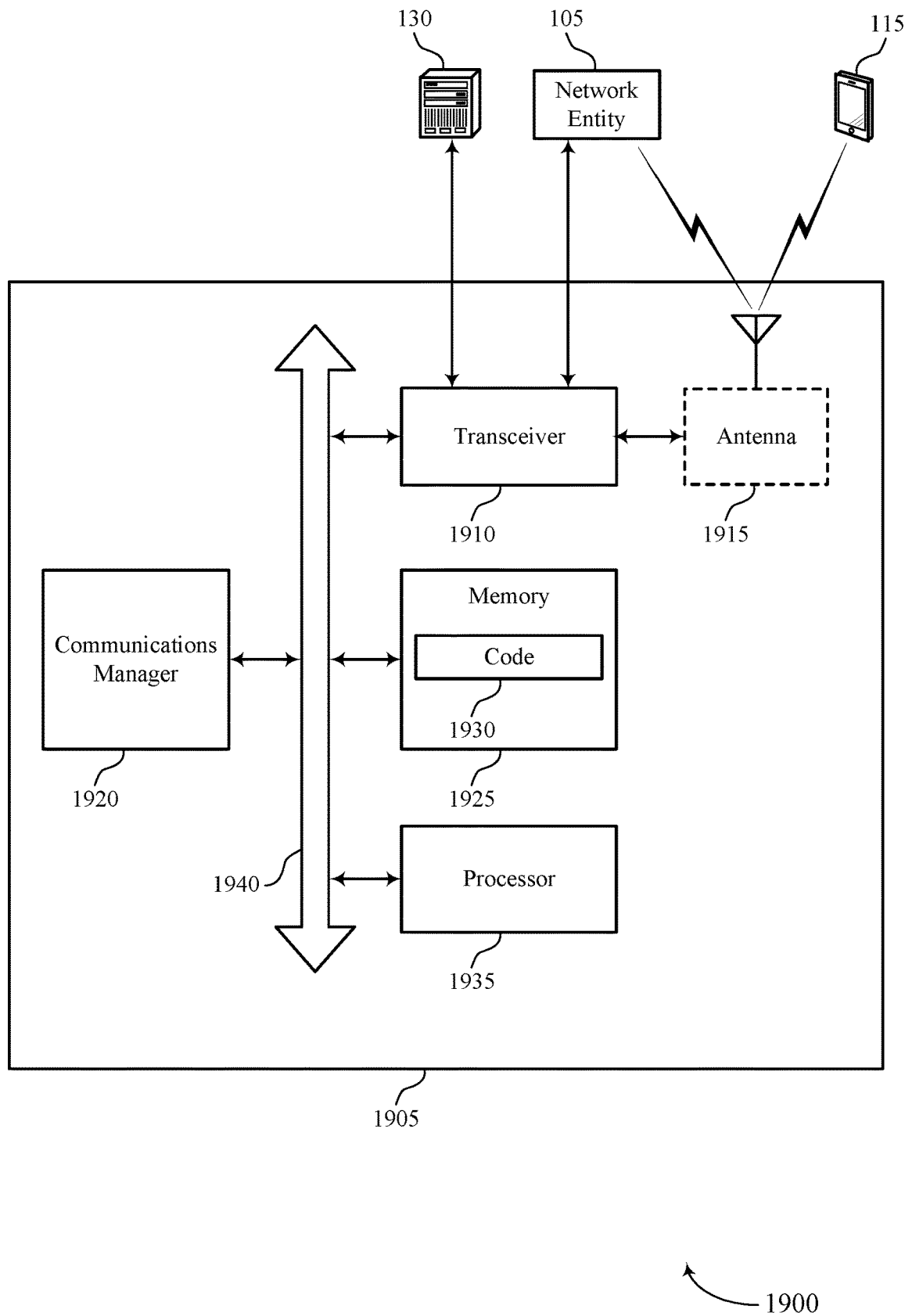
FIG. 19 shows a diagram of a system including a device that supports techniques for increasing NPRACH capacity in accordance with one or more aspects of the present disclosure.

FIG. 19 shows a diagram of a system 1900 including a device 1905 that supports techniques for increasing NPRACH capacity in accordance with one or more aspects of the present disclosure. The device 1905 may be an example of or include the components of a device 1605, a device 1705, or a network entity 105 as described herein. The device 1905 may communicate with one or more network entities 105, one or more UEs 115, or any combination thereof, which may include communications over one or more wired interfaces, over one or more wireless interfaces, or any combination thereof. The device 1905 may include components that support outputting and obtaining communications, such as a communications manager 1920, a transceiver 1910, an antenna 1915, a memory 1925, code 1930, and a processor 1935. These components may be in electronic communication or otherwise coupled (e.g., operatively, communicatively, functionally, electronically, electrically) via one or more buses (e.g., a bus 1940).

The transceiver 1910 may support bi-directional communications via wired links, wireless links, or both as described herein. In some examples, the transceiver 1910 may include a wired transceiver and may communicate bi-directionally with another wired transceiver. Additionally, or alternatively, in some examples, the transceiver 1910 may include a wireless transceiver and may communicate bi-directionally with another wireless transceiver. In some examples, the device 1905 may include one or more antennas 1915, which may be capable of transmitting or receiving wireless transmissions (e.g., concurrently). The transceiver 1910 may also include a modem to modulate signals, to provide the modulated signals for transmission (e.g., by one or more antennas 1915, by a wired transmitter), to receive modulated signals (e.g., from one or more antennas 1915, from a wired receiver), and to demodulate signals. In some implementations, the transceiver 1910 may include one or more interfaces, such as one or more interfaces coupled with the one or more antennas 1915 that are configured to support various receiving or obtaining operations, or one or more interfaces coupled with the one or more antennas 1915 that are configured to support various transmitting or outputting operations, or a combination thereof. In some implementations, the transceiver 1910 may include or be configured for coupling with one or more processors or memory components that are operable to perform or support operations based on received or obtained information or signals, or to generate information or other signals for transmission or other outputting, or any combination thereof. In some implementations, the transceiver 1910, or the transceiver 1910 and the one or more antennas 1915, or the transceiver 1910 and the one or more antennas 1915 and one or more processors or memory components (for example, the processor 1935, or the memory 1925, or both), may be included in a chip or chip assembly that is installed in the device 1905. In some examples, the transceiver may be operable to support communications via one or more communications links (e.g., a communication link 125, a backhaul communication link 120, a midhaul communication link 162, a fronthaul communication link 168).

The memory 1925 may include RAM and ROM. The memory 1925 may store computer-readable, computer-executable code 1930 including instructions that, when executed by the processor 1935, cause the device 1905 to perform various functions described herein. The code 1930 may be stored in a non-transitory computer-readable medium such as system memory or another type of memory. In some cases, the code 1930 may not be directly executable by the processor 1935 but may cause a computer (e.g., when compiled and executed) to perform functions described herein. In some cases, the memory 1925 may contain, among other things, a BIOS which may control basic hardware or software operation such as the interaction with peripheral components or devices.

The processor 1935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1935 may be configured to operate a memory array using a memory controller. In some other cases, a memory controller may be integrated into the processor 1935. The processor 1935 may be configured to execute computer-readable instructions stored in a memory (e.g., the memory 1925) to cause the device 1905 to perform various functions (e.g., functions or tasks supporting techniques for increasing NPRACH capacity). For example, the device 1905 or a component of the device 1905 may include a processor 1935 and memory 1925 coupled with the processor 1935, the processor 1935 and memory 1925 configured to perform various functions described herein. The processor 1935 may be an example of a cloud-computing platform (e.g., one or more physical nodes and supporting software such as operating systems, virtual machines, or container instances) that may host the functions (e.g., by executing code 1930) to perform the functions of the device 1905. The processor 1935 may be any one or more suitable processors capable of executing scripts or instructions of one or more software programs stored in the device 1905 (such as within the memory 1925). In some implementations, the processor 1935 may be a component of a processing system. A processing system may generally refer to a system or series of machines or components that receives inputs and processes the inputs to produce a set of outputs (which may be passed to other systems or components of, for example, the device 1905). For example, a processing system of the device 1905 may refer to a system including the various other components or subcomponents of the device 1905, such as the processor 1935, or the transceiver 1910, or the communications manager 1920, or other components or combinations of components of the device 1905. The processing system of the device 1905 may interface with other components of the device 1905, and may process information received from other components (such as inputs or signals) or output information to other components. For example, a chip or modem of the device 1905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1905 may transmit information output from the chip or modem. Additionally, or alternatively, in some implementations, the one or more interfaces may refer to an interface between the processing system of the chip or modem and a receiver, such that the device 1905 may obtain information or signal inputs, and the information may be passed to the processing system. A person having ordinary skill in the art will readily recognize that a first interface also may obtain information or signal inputs, and a second interface also may output information or signal outputs.

In some examples, a bus 1940 may support communications of (e.g., within) a protocol layer of a protocol stack. In some examples, a bus 1940 may support communications associated with a logical channel of a protocol stack (e.g., between protocol layers of a protocol stack), which may include communications performed within a component of the device 1905, or between different components of the device 1905 that may be co-located or located in different locations (e.g., where the device 1905 may refer to a system in which one or more of the communications manager 1920, the transceiver 1910, the memory 1925, the code 1930, and the processor 1935 may be located in one of the different components or divided between different components).

In some examples, the communications manager 1920 may manage aspects of communications with a core network 130 (e.g., via one or more wired or wireless backhaul links). For example, the communications manager 1920 may manage the transfer of data communications for client devices, such as one or more UEs 115. In some examples, the communications manager 1920 may manage communications with other network entities 105, and may include a controller or scheduler for controlling communications with UEs 115 in cooperation with other network entities 105. In some examples, the communications manager 1920 may support an X2 interface within an LTE/LTE-A wireless communications network technology to provide communication between network entities 105.

The communications manager 1920 may support wireless communications at a network entity in accordance with examples as disclosed herein. For example, the communications manager 1920 is capable of, configured to, or operable to support a means for performing an access procedure for establishing a connection with a UE. The communications manager 1920 is capable of, configured to, or operable to support a means for receiving, as part of the access procedure, one or more repetitions of an NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs.

By including or configuring the communications manager 1920 in accordance with examples as described herein, the device 1905 may support techniques for reduced latency by reducing wait times associated with an NPRACH being unavailable. For example, the device 1905 may support an increased quantity of transmission opportunities at a given time over the NPRACH by increasing a capacity of the NPRACH, which may support reduced latencies and improve user experience.

In some examples, the communications manager 1920 may be configured to perform various operations (e.g., receiving, obtaining, monitoring, outputting, transmitting) using or otherwise in cooperation with the transceiver 1910, the one or more antennas 1915 (e.g., where applicable), or any combination thereof. Although the communications manager 1920 is illustrated as a separate component, in some examples, one or more functions described with reference to the communications manager 1920 may be supported by or performed by the transceiver 1910, the processor 1935, the memory 1925, the code 1930, or any combination thereof. For example, the code 1930 may include instructions executable by the processor 1935 to cause the device 1905 to perform various aspects of techniques for increasing NPRACH capacity as described herein, or the processor 1935 and the memory 1925 may be otherwise configured to perform or support such operations.

Figure 20:
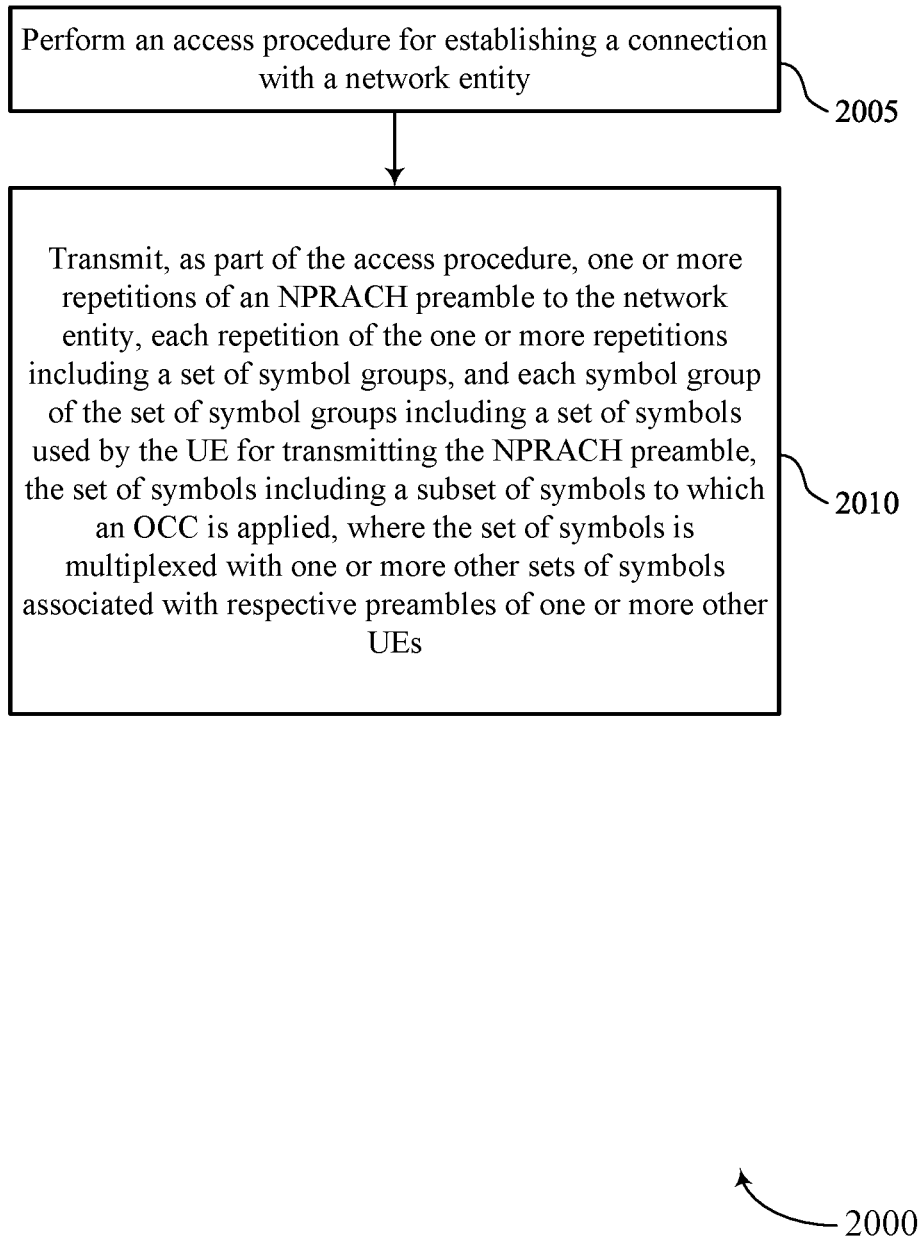
FIGS. 20 through 24 show flowcharts illustrating methods that support techniques for increasing NPRACH capacity in accordance with one or more aspects of the present disclosure.

FIG. 20 shows a flowchart illustrating a method 2000 that supports techniques for increasing NPRACH capacity in accordance with aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2005, the method may include performing an access procedure for establishing a connection with a network entity. The operations of 2005 may be performed in accordance with examples as disclosed herein. In some examples, aspects of the operations of 2005 may be performed by 1425 as described with reference to FIG. 14.

At 2010, the method may include transmitting, as part of the access procedure, one or more repetitions of an NPRACH preamble to the network entity, each repetition of the one or more repetitions including a set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of one or more other UEs. The operations of 2010 may be performed in accordance with examples as disclosed herein. In some examples, aspects of the operations of 2010 may be performed by 1425 as described with reference to FIG. 14.

Figure 21:
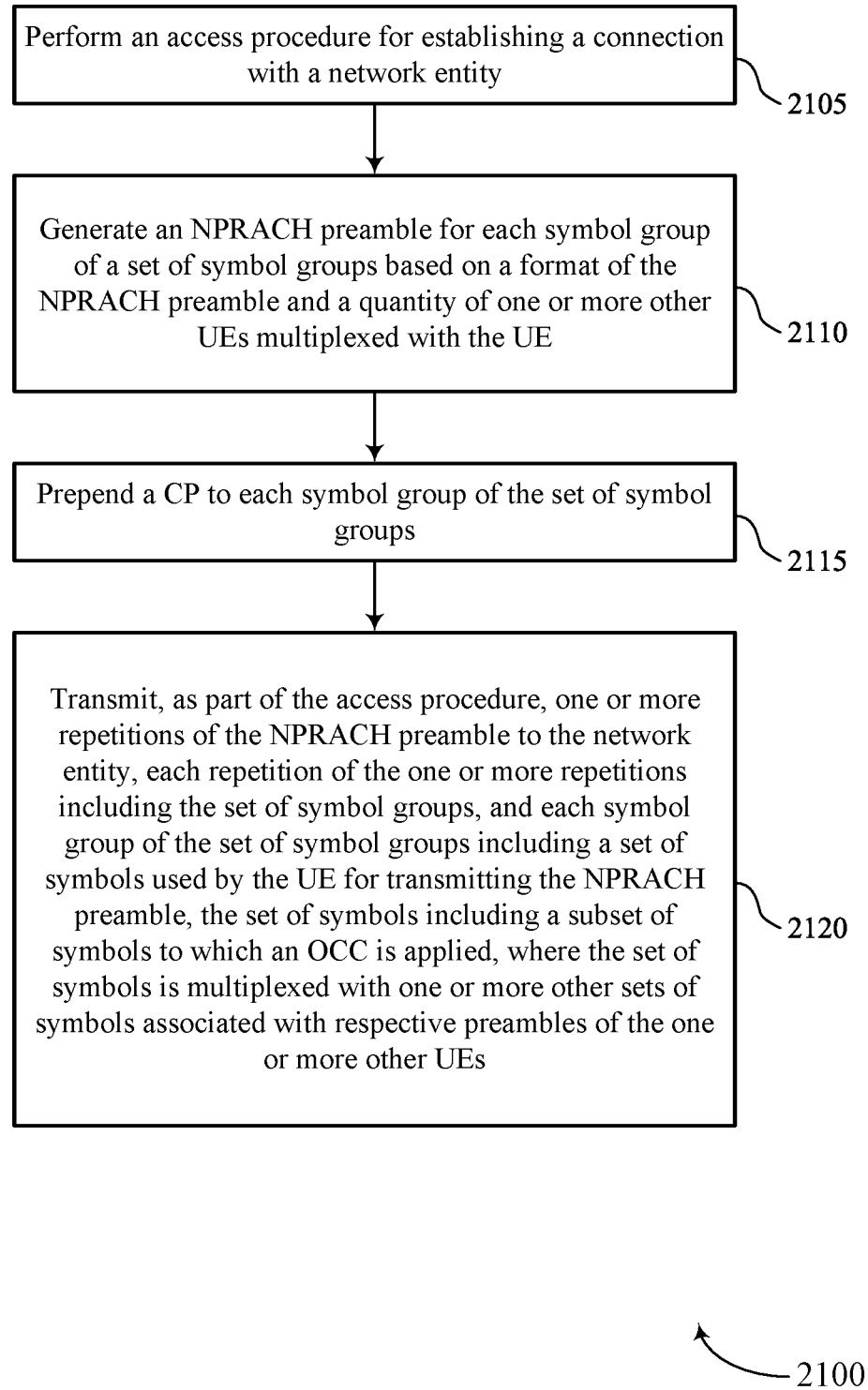

FIG. 21 shows a flowchart illustrating a method 2100 that supports techniques for increasing NPRACH capacity in accordance with aspects of the present disclosure. The operations of the method 2100 may be implemented by a UE or its components as described herein. For example, the operations of the method 2100 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2105, the method may include performing an access procedure for establishing a connection with a network entity. The operations of 2105 may be performed in accordance with examples as disclosed herein. In some examples, aspects of the operations of 2105 may be performed by 1425 as described with reference to FIG. 14.

At 2110, the method may include generating an NPRACH preamble for each symbol group of a set of symbol groups based on a format of the NPRACH preamble and a quantity of one or more other UEs multiplexed with the UE. The operations of 2110 may be performed in accordance with examples as disclosed herein. In some examples, aspects of the operations of 2110 may be performed by 1425 as described with reference to FIG. 14.

At 2115, the method may include prepending a CP to each symbol group of the set of symbol groups. The operations of 2115 may be performed in accordance with examples as disclosed herein. In some examples, aspects of the operations of 2115 may be performed by 1425 as described with reference to FIG. 14.

At 2120, the method may include transmitting, as part of the access procedure, one or more repetitions of the NPRACH preamble to the network entity, each repetition of the one or more repetitions including the set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of the one or more other UEs. The operations of 2120 may be performed in accordance with examples as disclosed herein. In some examples, aspects of the operations of 2120 may be performed by 1425 as described with reference to FIG. 14.

Figure 22:
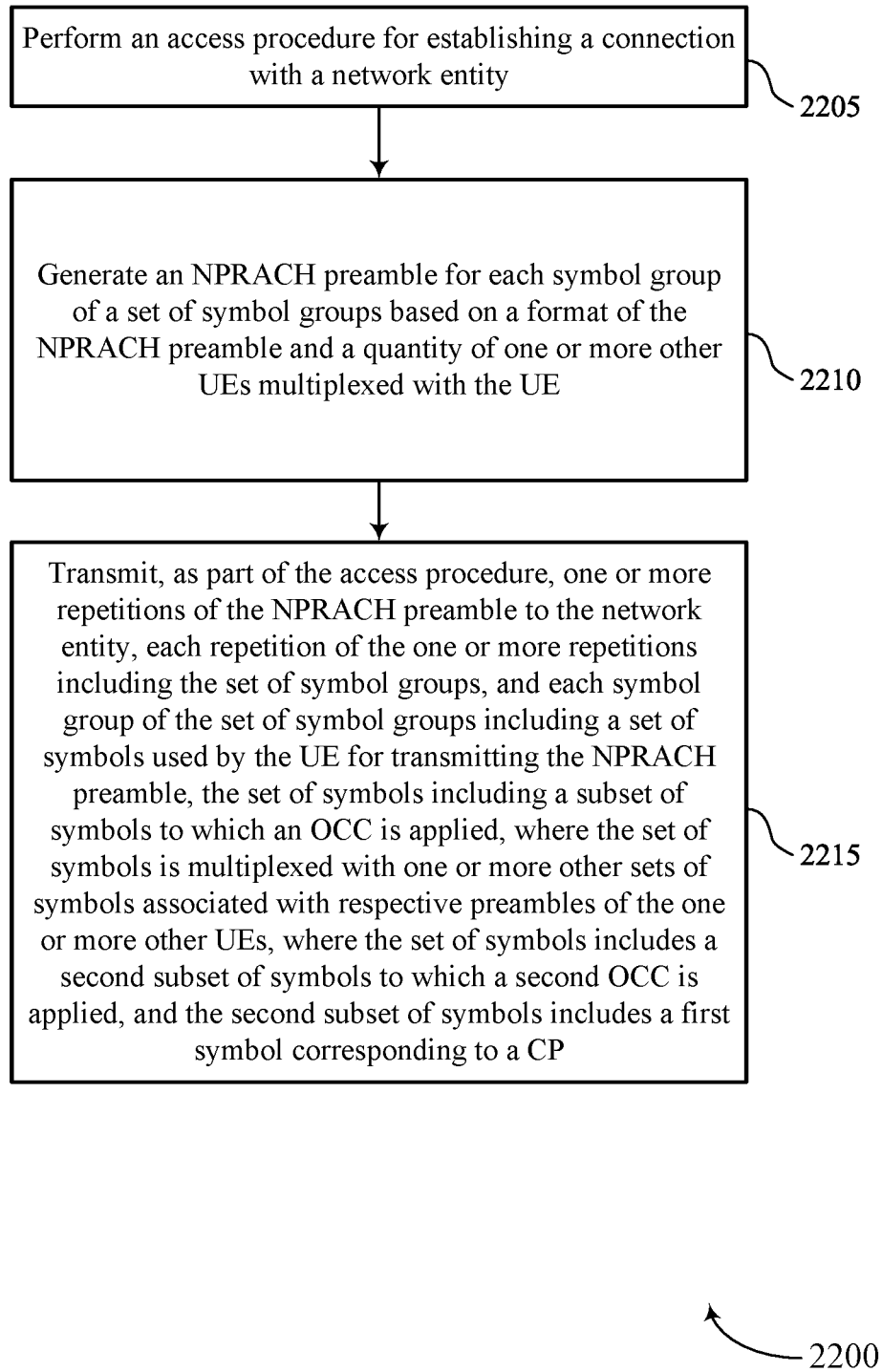

FIG. 22 shows a flowchart illustrating a method 2200 that supports techniques for increasing NPRACH capacity in accordance with aspects of the present disclosure. The operations of the method 2200 may be implemented by a UE or its components as described herein. For example, the operations of the method 2200 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2205, the method may include performing an access procedure for establishing a connection with a network entity. The operations of 2205 may be performed in accordance with examples as disclosed herein. In some examples, aspects of the operations of 2205 may be performed by 1425 as described with reference to FIG. 14.

At 2210, the method may include generating an NPRACH preamble for each symbol group of a set of symbol groups based on a format of the NPRACH preamble and a quantity of one or more other UEs multiplexed with the UE. The operations of 2210 may be performed in accordance with examples as disclosed herein. In some examples, aspects of the operations of 2210 may be performed by 1425 as described with reference to FIG. 14.

At 2215, the method may include transmitting, as part of the access procedure, one or more repetitions of the NPRACH preamble to the network entity, each repetition of the one or more repetitions including the set of symbol groups, and each symbol group of the set of symbol groups including a set of symbols used by the UE for transmitting the NPRACH preamble, the set of symbols including a subset of symbols to which an OCC is applied, where the set of symbols is multiplexed with one or more other sets of symbols associated with respective preambles of the one or more other UEs, where the set of symbols includes a second subset of symbols to which a second OCC is applied, and the second subset of symbols includes a first symbol corresponding to a CP. The operations of 2215 may be performed in accordance with examples as disclosed herein. In some examples, aspects of the operations of 2215 may be performed by 1425 as described with reference to FIG. 14.

Figure 23:
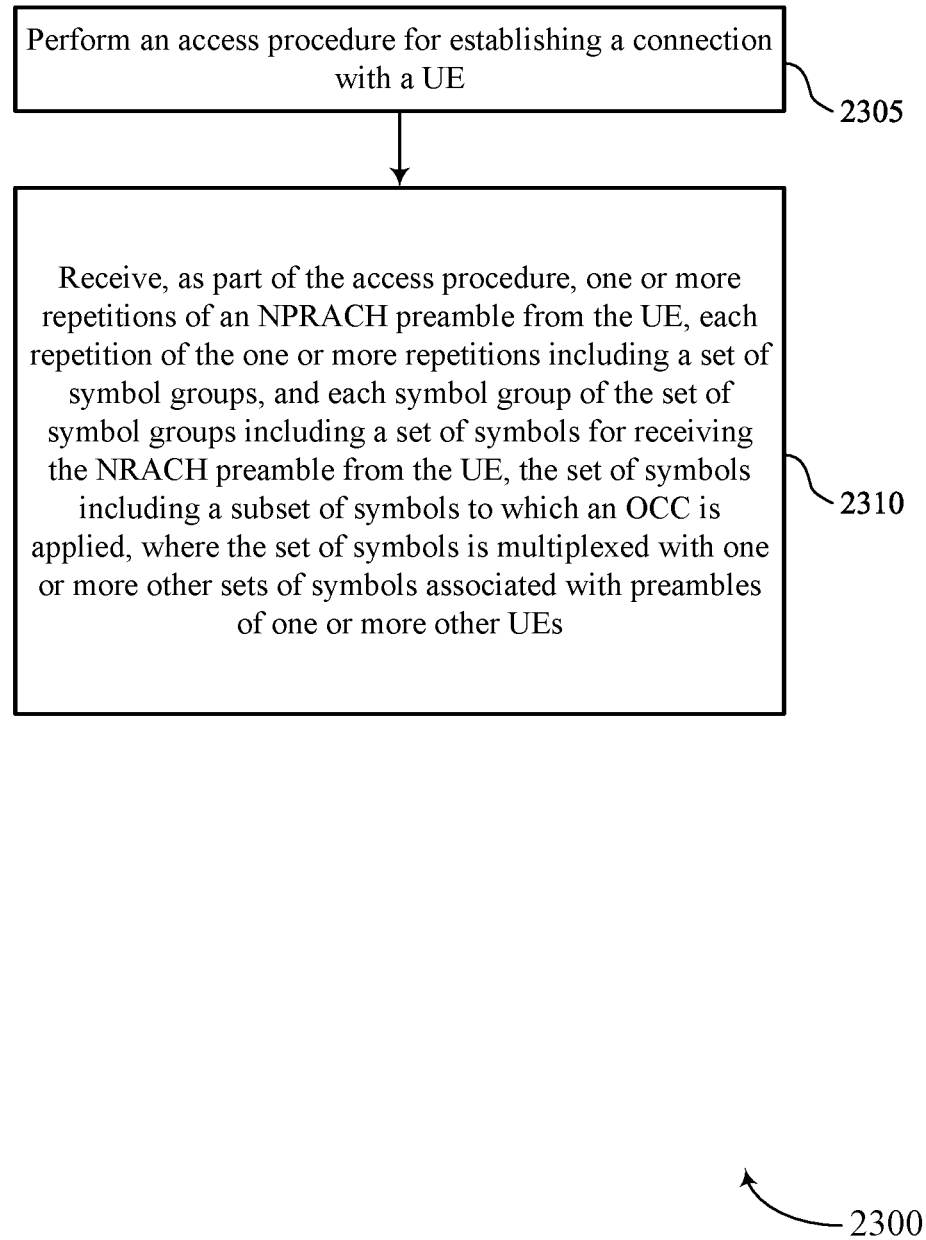

FIG. 23 shows a flowchart illustrating a method 2300 that supports techniques for increasing NPRACH capacity in accordance with aspects of the present disclosure. The operations of the method 2300 may be implemented by a network entity or its components as described herein. For example, the operations of the method 2300 may be performed by a network entity as described with reference to FIGS. 1 through 11 and 16 through 19. In some examples, a network entity may execute a set of instructions to control the functional elements of the network entity to perform the described functions. Additionally, or alternatively, the network entity may perform aspects of the described functions using special-purpose hardware.

At 2305, the method may include performing an access procedure for establishing a connection with a UE. The operations of 2305 may be performed in accordance with examples as disclosed herein. In some examples, aspects of the operations of 2305 may be performed by 1825 as described with reference to FIG. 18.

At 2310, the method may include receiving, as part of the access procedure, one or more repetitions of an NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs. The operations of 2310 may be performed in accordance with examples as disclosed herein. In some examples, aspects of the operations of 2310 may be performed by 1825 as described with reference to FIG. 18.

Figure 24:
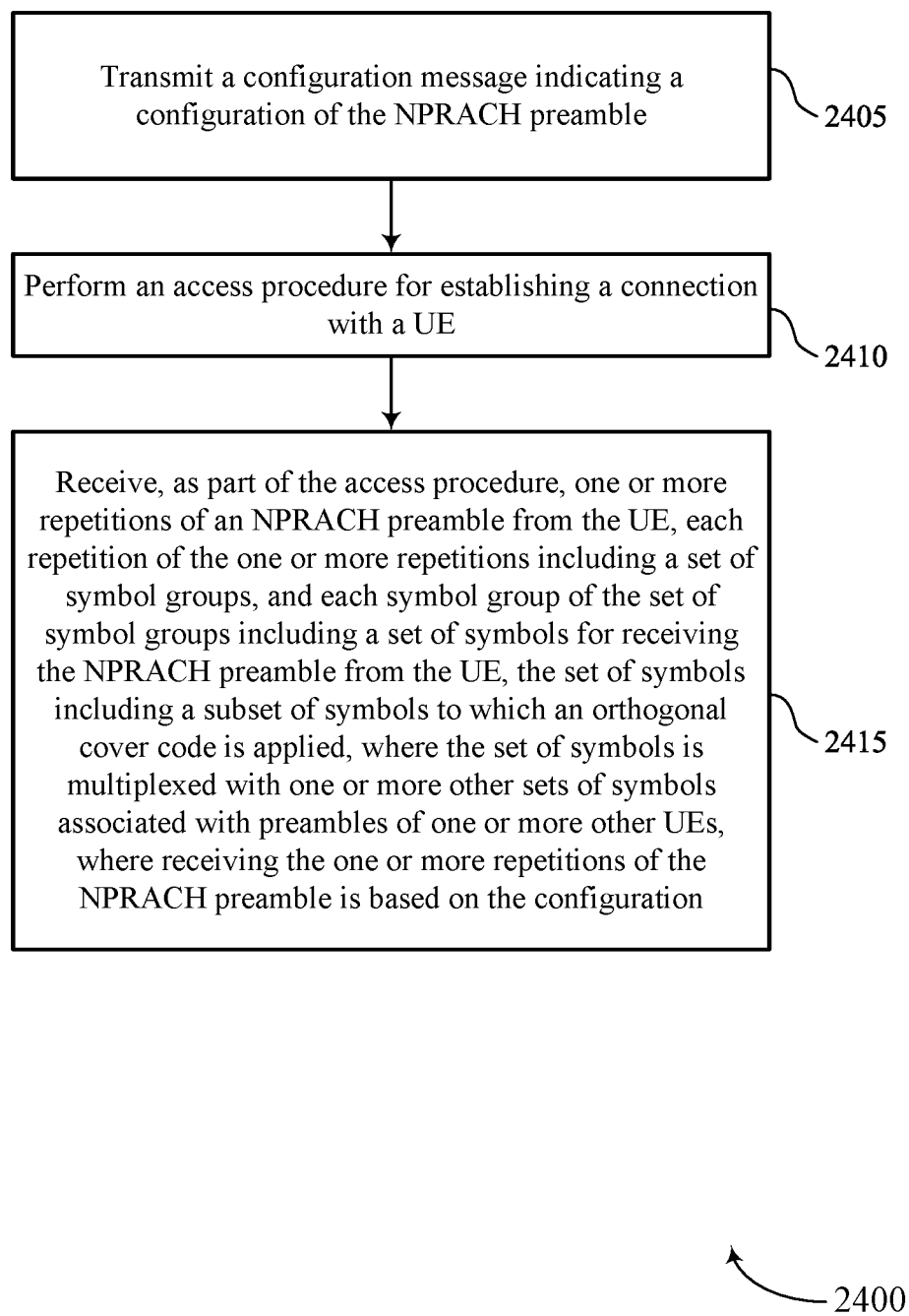

FIG. 24 shows a flowchart illustrating a method 2400 that supports techniques for increasing NPRACH capacity in accordance with aspects of the present disclosure. The operations of the method 2400 may be implemented by a network entity or its components as described herein. For example, the operations of the method 2400 may be performed by a network entity as described with reference to FIGS. 1 through 11 and 16 through 19. In some examples, a network entity may execute a set of instructions to control the functional elements of the network entity to perform the described functions. Additionally, or alternatively, the network entity may perform aspects of the described functions using special-purpose hardware.

At 2405, the method may include transmitting a configuration message indicating a configuration of an NPRACH preamble. The operations of 2405 may be performed in accordance with examples as disclosed herein. In some examples, aspects of the operations of 2405 may be performed by 1825 as described with reference to FIG. 18.

At 2410, the method may include performing an access procedure for establishing a connection with a UE. The operations of 2410 may be performed in accordance with examples as disclosed herein. In some examples, aspects of the operations of 2410 may be performed by 1825 as described with reference to FIG. 18.

At 2415, the method may include receiving, as part of the access procedure, one or more repetitions of the NPRACH preamble from the UE, each repetition of the one or more repetitions including a set of symbol groups, and each symbol group of the set of symbol groups including a set of symbols for receiving the NPRACH preamble from the UE, the set of symbols including a subset of symbols to which an OCC is applied, where the set of symbols is multiplexed with one or more other sets of symbols associated with preambles of one or more other UEs, where receiving the one or more repetitions of the NPRACH preamble is based on the configuration. The operations of 2415 may be performed in accordance with examples as disclosed herein. In some examples, aspects of the operations of 2415 may be performed by 1825 as described with reference to FIG. 18.

The following provides an overview of aspects of the present disclosure:

Aspect 1: A method for wireless communications at a UE, comprising: performing an access procedure for establishing a connection with a network entity; and transmitting, as part of the access procedure, one or more repetitions of a NPRACH preamble to the network entity, each repetition of the one or more repetitions comprising a set of symbol groups, and each symbol group of the set of symbol groups comprising a set of symbols used by the UE for transmitting the NPRACH preamble, the set of symbols comprising a subset of symbols to which an OCC is applied, wherein the set of symbols is multiplexed with one or more other sets of symbols associated with respective preambles of one or more other UEs.

Aspect 2: The method of aspect 1, further comprising: generating the NPRACH preamble for each symbol group of the set of symbol groups based at least in part on a format of the NPRACH preamble and a quantity of the one or more other UEs multiplexed with the UE; and prepending a CP to each symbol group of the set of symbol groups.

Aspect 3: The method of aspect 2, further comprising: determining a quantity of symbols of the subset of symbols for transmitting the NPRACH preamble, wherein the quantity of symbols is based at least in part on the quantity of the one or more other UEs multiplexed with the UE, and wherein the NPRACH preamble is generated based at least in part on the quantity of symbols.

Aspect 4: The method of aspect 3, wherein the set of symbols comprises the subset of symbols and zero or more empty symbols different from the subset of symbols.

Aspect 5: The method of any of aspects 3 through 4, wherein the set of symbols comprises two or more copies of the subset of symbols and one or more empty symbols different from the subset of symbols, and the OCC is applied to each copy of the two or more copies.

Aspect 6: The method of any of aspects 3 through 5, wherein the set of symbols comprises a second subset of symbols to which a second OCC is applied.

Aspect 7: The method of aspect 1, further comprising: generating the NPRACH preamble for each symbol group of the set of symbol groups based at least in part on a format of the NPRACH preamble and a quantity of the one or more other UEs multiplexed with the UE, wherein the set of symbols comprises a second subset of symbols to which a second OCC is applied, and the second subset of symbols comprises a first symbol corresponding to a CP.

Aspect 8: The method of aspect 7, further comprising: determining a quantity of symbols of the subset of symbols for transmitting the NPRACH preamble, wherein the quantity of symbols is based at least in part on the quantity of the one or more other UEs multiplexed with the UE and based at least in part on the second subset of symbols comprising the first symbol corresponding to the CP.

Aspect 9: The method of aspect 8, wherein the set of symbols comprises one or more copies of the subset of symbols to which the OCC is applied and the second subset of symbols to which the second OCC is applied, the second OCC comprising a cyclically-shifted version of the OCC.

Aspect 10: The method of aspect 9, wherein a last symbol of the subset of symbols is the same as the first symbol of the second subset of symbols corresponding to the CP, the first symbol of the second subset of symbols is based at least in part on the second OCC.

Aspect 11: The method of any of aspects 7 through 10, wherein the format of the NPRACH preamble is Format 1.

Aspect 12: The method of any of aspects 1 through 11, further comprising: receiving a configuration message indicating a configuration of the NPRACH preamble, wherein transmitting the one or more repetitions of the NPRACH preamble is based at least in part on the configuration.

Aspect 13: The method of aspect 12, wherein the configuration message is received via a system information block.

Aspect 14: The method of any of aspects 12 through 13, wherein the configuration message indicates one or more OCCs including the OCC.

Aspect 15: A method for wireless communications at a network entity, comprising: performing an access procedure for establishing a connection with a UE; and receiving, as part of the access procedure, one or more repetitions of a NPRACH preamble from the UE, each repetition of the one or more repetitions comprising a set of symbol groups, and each symbol group of the set of symbol groups comprising a set of symbols for receiving the NPRACH preamble from the UE, the set of symbols comprising a subset of symbols to which an OCC is applied, wherein the set of symbols is multiplexed with one or more other sets of symbols associated with preambles of one or more other UEs.

Aspect 16: The method of aspect 15, wherein the NPRACH preamble for each symbol group of the set of symbol groups is based at least in part on a format of the NPRACH preamble and a quantity of the one or more other UEs multiplexed with the UE, and a CP is prepended to each symbol group of the set of symbol groups.

Aspect 17: The method of aspect 16, wherein a quantity of symbols of the subset of symbols for the NPRACH preamble is based at least in part on the quantity of the one or more other UEs multiplexed with the UE.

Aspect 18: The method of aspect 17, wherein the set of symbols comprises the subset of symbols and zero or more empty symbols different from the subset of symbols.

Aspect 19: The method of any of aspects 17 through 18, wherein the set of symbols comprises two or more copies of the subset of symbols and one or more empty symbols different from the subset of symbols, and the OCC is applied to each copy of the two or more copies.

Aspect 20: The method of any of aspects 17 through 19, wherein the set of symbols comprises a second subset of symbols to which a second OCC is applied.

Aspect 21: The method of aspect 15, wherein the NPRACH preamble for each symbol group of the set of symbol groups is based at least in part on a format of the NPRACH preamble and a quantity of the one or more other UEs multiplexed with the UE, the set of symbols comprises a second subset of symbols to which a second OCC is applied, and the second subset of symbols comprises a first symbol corresponding to a CP.

Aspect 22: The method of aspect 21, wherein a quantity of symbols of the subset of symbols for receiving the NPRACH preamble is based at least in part on the quantity of the one or more other UEs multiplexed with the UE and based at least in part on the second subset of symbols comprising the first symbol corresponding to the CP.

Aspect 23: The method of aspect 22, wherein the set of symbols comprises one or more copies of the subset of symbols to which the OCC is applied and the second subset of symbols to which the second OCC is applied, the second OCC comprising a cyclically-shifted version of the OCC.

Aspect 24: The method of any of aspects 22 through 23, wherein a last symbol of the subset of symbols is the same as the first symbol of the second subset of symbols corresponding to the CP, the first symbol of the second subset of symbols is based at least in part on the second OCC.

Aspect 25: The method of any of aspects 15 through 24, wherein the one or more repetitions of the NPRACH preamble are combined, the access procedure is based at least in part on a combination of the one or more repetitions.

Aspect 26: The method of any of aspects 15 through 25, further comprising: transmitting a configuration message indicating a configuration of the NPRACH preamble, wherein receiving the one or more repetitions of the NPRACH preamble is based at least in part on the configuration.

Aspect 27: The method of aspect 26, wherein the configuration message is transmitted via a system information block.

Aspect 28: The method of any of aspects 26 through 27, wherein the configuration message includes one or more OCCs including the OCC.

Aspect 29: An apparatus for wireless communications at a UE, comprising at least one processor; at least one memory coupled with the at least one processor; and instructions stored in the at least one memory and executable by the at least one processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising at least one processor; at least one memory coupled with the at least one processor; and instructions stored in the at least one memory and executable by the at least one processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    at least one processor;
    at least one memory coupled with the at least one processor; and
    instructions stored in the at least one memory and executable by the at least one processor to cause the apparatus to:
        perform an access procedure for establishing a connection with a network entity; and
        transmit, as part of the access procedure, one or more repetitions of a narrowband physical random access channel preamble to the network entity, each repetition of the one or more repetitions comprising a set of symbol groups, and each symbol group of the set of symbol groups comprising a set of symbols used by the UE for transmitting the narrowband physical random access channel preamble, the set of symbols comprising a subset of symbols to which an orthogonal cover code is applied, wherein the set of symbols is multiplexed with one or more other sets of symbols associated with respective preambles of one or more other UEs, and wherein a quantity of symbols of the subset of symbols to which the orthogonal cover code is applied is based at least in part on a quantity of the one or more other UEs multiplexed with the UE.

2. The apparatus of claim 1, wherein the instructions are further executable by the at least one processor to cause the apparatus to:
generate the narrowband physical random access channel preamble for each symbol group of the set of symbol groups based at least in part on a format of the narrowband physical random access channel preamble and the quantity of the one or more other UEs multiplexed with the UE; and
prepend a cyclic prefix to each symbol group of the set of symbol groups.

3. The apparatus of claim 2, wherein the instructions are further executable by the at least one processor to cause the apparatus to:
determine the quantity of symbols of the subset of symbols for transmitting the narrowband physical random access channel preamble, wherein the narrowband physical random access channel preamble is generated based at least in part on the quantity of symbols.

4. The apparatus of claim 3, wherein the set of symbols comprises the subset of symbols and zero or more empty symbols different from the subset of symbols.

5. The apparatus of claim 3, wherein the set of symbols comprises two or more copies of the subset of symbols and one or more empty symbols different from the subset of symbols, and wherein the orthogonal cover code is applied to each copy of the two or more copies.

6. The apparatus of claim 3, wherein the set of symbols comprises a second subset of symbols to which a second orthogonal cover code is applied.

7. The apparatus of claim 1, wherein the instructions are further executable by the at least one processor to cause the apparatus to:
generate the narrowband physical random access channel preamble for each symbol group of the set of symbol groups based at least in part on a format of the narrowband physical random access channel preamble and the quantity of the one or more other UEs multiplexed with the UE, wherein the set of symbols comprises a second subset of symbols to which a second orthogonal cover code is applied, and the second subset of symbols comprises a first symbol corresponding to a cyclic prefix.

8. The apparatus of claim 7, wherein the instructions are further executable by the at least one processor to cause the apparatus to:
determine a second quantity of symbols of the second subset of symbols for transmitting the narrowband physical random access channel preamble, wherein the second quantity of symbols is the same as the quantity of symbols.

9. The apparatus of claim 8, wherein the set of symbols comprises one or more copies of the subset of symbols to which the orthogonal cover code is applied and the second subset of symbols to which the second orthogonal cover code is applied, the second orthogonal cover code comprising a cyclically-shifted version of the orthogonal cover code.

10. The apparatus of claim 9, wherein a last symbol of the subset of symbols is the same as the first symbol of the second subset of symbols corresponding to the cyclic prefix, wherein the first symbol of the second subset of symbols is based at least in part on the second orthogonal cover code.

11. The apparatus of claim 7, wherein the format of the narrowband physical random access channel preamble is format 1.

12. The apparatus of claim 1, wherein the instructions are further executable by the at least one processor to cause the apparatus to:
receive a configuration message indicating a configuration of the narrowband physical random access channel preamble, wherein transmitting the one or more repetitions of the narrowband physical random access channel preamble is based at least in part on the configuration.

13. The apparatus of claim 12, wherein the configuration message is received via a system information block.

14. The apparatus of claim 12, wherein the configuration message indicates one or more orthogonal cover codes including the orthogonal cover code.

15. The apparatus of claim 6, wherein the second subset of symbols comprises a second quantity of symbols different from the quantity of symbols.

16. An apparatus for wireless communications at a network entity, comprising:
at least one processor;
at least one memory coupled with the at least one processor; and
instructions stored in the at least one memory and executable by the at least one processor to cause the apparatus to:
perform an access procedure for establishing a connection with a user equipment (UE); and
receive, as part of the access procedure, one or more repetitions of a narrowband physical random access channel preamble from the UE, each repetition of the one or more repetitions comprising a set of symbol groups, and each symbol group of the set of symbol groups comprising a set of symbols for receiving the narrowband physical random access channel preamble from the UE, the set of symbols comprising a subset of symbols to which an orthogonal cover code is applied, wherein the set of symbols is multiplexed with one or more other sets of symbols associated with preambles of one or more other UEs, and wherein a quantity of symbols of the subset of symbols to which the orthogonal cover code is applied is based at least in part on a quantity of the one or more other UEs multiplexed with the UE.

17. The apparatus of claim 16, wherein the narrowband physical random access channel preamble for each symbol group of the set of symbol groups is based at least in part on a format of the narrowband physical random access channel preamble and a quantity of the one or more other UEs multiplexed with the UE, and wherein a cyclic prefix is prepended to each symbol group of the set of symbol groups.

18. The apparatus of claim 17, wherein the set of symbols comprises the subset of symbols and zero or more empty symbols different from the subset of symbols.

19. The apparatus of claim 17, wherein the set of symbols comprises two or more copies of the subset of symbols and zero or more empty symbols different from the subset of symbols, and wherein the orthogonal cover code is applied to each copy of the two or more copies.

20. The apparatus of claim 17, wherein the set of symbols comprises a second subset of symbols to which a second orthogonal cover code is applied.

21. The apparatus of claim 16, wherein the narrowband physical random access channel preamble for each symbol group of the set of symbol groups is based at least in part on a format of the narrowband physical random access channel preamble and a quantity of the one or more other UEs multiplexed with the UE, wherein the set of symbols comprises a second subset of symbols to which a second orthogonal cover code is applied, and the second subset of symbols comprises a first symbol corresponding to a cyclic prefix.

22. The apparatus of claim 21, wherein a quantity of symbols of the subset of symbols for receiving the narrowband physical random access channel preamble is based at least in part on the quantity of the one or more other UEs multiplexed with the UE and based at least in part on the second subset of symbols comprising the first symbol corresponding to the cyclic prefix.

23. The apparatus of claim 22, wherein the set of symbols comprises one or more copies of the subset of symbols to which the orthogonal cover code is applied and the second subset of symbols to which the second orthogonal cover code is applied, the second orthogonal cover code comprising a cyclically-shifted version of the orthogonal cover code.

24. The apparatus of claim 22, wherein a last symbol of the subset of symbols is the same as the first symbol of the second subset of symbols corresponding to the cyclic prefix, wherein the first symbol of the second subset of symbols is based at least in part on the second orthogonal cover code.

25. The apparatus of claim 16, wherein the one or more repetitions of the narrowband physical random access channel preamble are combined, wherein the access procedure is based at least in part on a combination of the one or more repetitions.

26. The apparatus of claim 16, wherein the instructions are further executable by the at least one processor to cause the apparatus to:
transmit a configuration message indicating a configuration of the narrowband physical random access channel preamble, wherein receiving the one or more repetitions of the narrowband physical random access channel preamble is based at least in part on the configuration.

27. The apparatus of claim 26, wherein the configuration message is transmitted via a system information block.

28. The apparatus of claim 26, wherein the configuration message includes one or more orthogonal cover codes including the orthogonal cover code.

29. A method for wireless communications at a user equipment (UE), comprising:
performing an access procedure for establishing a connection with a network entity; and
transmitting, as part of the access procedure, one or more repetitions of a narrowband physical random access channel preamble to the network entity, each repetition of the one or more repetitions comprising a set of symbol groups, and each symbol group of the set of symbol groups comprising a set of symbols used by the UE for transmitting the narrowband physical random access channel preamble, the set of symbols comprising a subset of symbols to which an orthogonal cover code is applied, wherein the set of symbols is multiplexed with one or more other sets of symbols associated with respective preambles of one or more other UEs, and wherein a quantity of symbols of the subset of symbols to which the orthogonal cover code is applied is based at least in part on a quantity of the one or more other UEs multiplexed with the UE.

30. A method for wireless communications at a network entity, comprising:
performing an access procedure for establishing a connection with a user equipment (UE); and
receiving, as part of the access procedure, one or more repetitions of a narrowband physical random access channel preamble from the UE, each repetition of the one or more repetitions comprising a set of symbol groups, and each symbol group of the set of symbol groups comprising a set of symbols for receiving the narrowband physical random access channel preamble from the UE, the set of symbols comprising a subset of symbols to which an orthogonal cover code is applied, wherein the set of symbols is multiplexed with one or more other sets of symbols associated with preambles of one or more other UEs, and wherein a quantity of symbols of the subset of symbols to which the orthogonal cover code is applied is based at least in part on a quantity of the one or more other UEs multiplexed with the UE.

* * * * *